United States Patent
DeGroat

(10) Patent No.: US 7,643,238 B2
(45) Date of Patent: Jan. 5, 2010

(54) DIBIT EXTRACTION

(75) Inventor: Ronald Dane DeGroat, Lakewood, CO (US)

(73) Assignee: Broadcom Corporation, Irvine, CA (US)

(*) Notice: Subject to any disclaimer, the term of this patent is extended or adjusted under 35 U.S.C. 154(b) by 731 days.

(21) Appl. No.: 11/322,023

(22) Filed: Dec. 29, 2005

(65) Prior Publication Data

US 2007/0047120 A1    Mar. 1, 2007

Related U.S. Application Data

(60) Provisional application No. 60/712,160, filed on Aug. 29, 2005.

(51) Int. Cl.
*G11B 5/35* (2006.01)

(52) U.S. Cl. ............... 360/65; 360/31; 360/39; 360/40; 360/53

(58) Field of Classification Search ............ None
See application file for complete search history.

(56) References Cited

U.S. PATENT DOCUMENTS

| | | | | |
|---|---|---|---|---|
| 5,583,705 | A * | 12/1996 | Ziperovich et al. | 360/45 |
| 6,208,477 | B1 * | 3/2001 | Cloke et al. | 360/31 |
| 6,249,398 | B1 * | 6/2001 | Fisher et al. | 360/65 |
| 6,256,159 | B1 * | 7/2001 | Bhakta | 360/40 |
| 6,516,443 | B1 * | 2/2003 | Zook | 714/792 |
| 6,636,372 | B1 * | 10/2003 | Nguyen et al. | 360/31 |
| 6,788,481 | B2 * | 9/2004 | Fang et al. | 360/31 |
| 6,937,650 | B2 * | 8/2005 | Coker et al. | 375/232 |
| 6,995,938 | B2 * | 2/2006 | Coker et al. | 360/75 |
| 7,170,704 | B2 * | 1/2007 | DeGroat et al. | 360/53 |
| 7,193,800 | B2 * | 3/2007 | Coker et al. | 360/48 |
| 2003/0179478 | A1 * | 9/2003 | Fang et al. | 360/31 |
| 2005/0078772 | A1 * | 4/2005 | Cideciyan et al. | 375/341 |

OTHER PUBLICATIONS

P. Newby and R. Wood, "The Effects of Nonlinear Distortion on Class IV Partial Response." IEEE Trans. On Magnetics, vol. 22, No. 5, pp. 1203-1205, Sep. 1986.

D. Palmer, P. Ziperovich, R. Wood and T. Howell, "Identification of Nonlinear Write Effects using Pseudorandom Sequences," IEEE Trans. On Magnetics, vol. 23. No. 5, pp. 2377-2379, Sep. 1987.

D. Palmer, J. Hong, D. Stanek and R. Wood, "Characterization of the Read/Write Process for Magnetic Recording," IEEE Trans. On Magnetics, vol. 31, No. 2, pp. 1071-1076, Mar. 1995.

D. Palmer, J. Coker, M. Meyer and P. Ziperovich, "Overwrite in Thin Media Measured by the Method of Pseudorandom Sequences," IEEE Trans. On Magnetics, vol. 24, No. 6, pp. 3096-3098, Nov. 1988.

(Continued)

*Primary Examiner*—Dismery E Mercedes
(74) *Attorney, Agent, or Firm*—Garlick Harrison & Markison; Shayne X. Short

(57) ABSTRACT

A novel means for performing dibit extraction is presented. Any one of an unequalized signal dibit, equalized signal dibit, or noise dibit can be extracted. Instead of using the correlation properties of a PN (Pseudo-Noise) sequence to approximate a PN deconvolution sequence, the use of the actual deconvolution sequence (i.e., PN sequence that includes values of +k and 0, where k is oftentimes 1) is employed so that no approximations are needed. The resulting estimate of the channel is therefore very accurate.

20 Claims, 16 Drawing Sheets

OTHER PUBLICATIONS

G. H. Lin, Y. Zhao and H. Neal Bertram. "Overwrite in Thin Film Disk Recording Systems," IEEE Trans. On Magnetics, vol. 29, No. 6, pp. 4215-4223, Nov. 1993.

H. Muraoka, S. Ohki and Y. Nakamura, Relationship between Overwrite and Transition Shift in Perpendicular Magnetic Recording, IEEE Trans. On Magnetics, vol. 30, No. 6, pp. 4272-4274, Nov. 1994.

W. Zhu, J. Chen, D. Kaiser, J.Judy, D.Palmer, "Experimental Study of Signal Dependent Noise in Perpendicular Recording," J. of Applied Physics, vol. 93, No. 10, pp. 8582-8584, May 15, 2003.

F. Jesse MacWilliams and Neil J. A. Sloane, "Pseudo-Random Sequences and Arrays," Proceedings of the IEEE, vol. 64, No. 12, Dec. 1976, pp. 1715-1728.

A. Taratorin, Characterization of Magnetic Recording Systems: A Practical Approach, Guzik Technical Enterprises, 1996. Guzik Part No. 99-900000-01 (an extension of "PRML: A Practical Approach, Introduction to PRML Concepts and Measurements," published in 1995) (whole book).

* cited by examiner

DIBIT EXTRACTION

CROSS REFERENCE TO RELATED PATENTS/PATENT APPLICATIONS

Provisional Priority Claims

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:

1. U.S. Provisional Application Ser. No. 60/712,160, entitled "Dibit extraction,", filed Monday, Aug. 29, 2005 (Aug. 29, 2005), pending.

BACKGROUND OF THE INVENTION

1. Technical Field of the Invention

The invention relates generally to memory storage devices; and, more particularly, it relates to dibit extraction being performed within such memory storage devices.

2. Description of Related Art

As is known, many varieties of disk drives, such as magnetic disk drives are used to provide data storage for a host device, either directly, or through a network such as a storage area network (SAN) or network attached storage (NAS). Typical host devices include stand alone computer systems such as a desktop or laptop computer, enterprise storage devices such as servers, storage arrays such as a redundant array of independent disks (RAID) arrays, storage routers, storage switches and storage directors, and other consumer devices such as video game systems and digital video recorders. These devices provide high storage capacity in a cost effective manner.

Within such disk drives, there is a need to characterize the channel that is employed to read/write information to the memory storage device that is employed to store/retrieve data to/from the media. One term sometimes used in the art when characterizing this channel response is dibit extraction. The extracted signal dibit is used to find the signal characteristics of the channel, and the noise dibit is used to find the noise characteristics of the channel. In the art, there are different ways to perform dibit extraction.

Many prior art approaches to dibit extraction, particularly the practical, real-time implementations, are not well suited to accommodate the newer technology of perpendicular magnetic recording (PMR), or the increasingly popular noise dibit. Practical implementations in the prior art use approximations that lead to scaling and DC boost problems. The incorrect scaling can be corrected relatively easily (even ignored in many cases), but the DC boost cannot.

The previous technology of longitudinal magnetic recording (LMR) did not exhibit the DC boost problem in signal dibit extraction because the LMR channel is DC free and the signal dibit is DC free, so the DC boost was zeroed out. However, signal dibits in PMR channels are not DC free, and noise dibits in both PMR and LMR channels are not DC free. Therefore, the DC boost problem can no longer be ignored.

Generally speaking, dibit extraction based on a periodic, maximal length, PN (pseudo-random noise) sequence is a highly flexible tool that can be used to identify many of the signal, noise, and nonlinear characteristics of a magnetic read/write channel. For more details, the reader is directed to the References listed below. There is seemingly a continual need in the art to find and develop better means by which dibit extraction can be performed.

REFERENCES

[1] P. Newby and R. Wood, "The Effects of Nonlinear Distortion on Class IV Partial Response," *IEEE Trans. On Magnetics*, Vol. 22, No. 5, pp. 1203-1205, September 1986.

[2] D. Palmer, P. Ziperovich, R. Wood and T. Howell, "Identification of Nonlinear Write Effects using Pseudorandom Sequences," *IEEE Trans. On Magnetics*, Vol. 23, No. 5, pp. 2377-2379, September 1987.

[3] D. Palmer, J. Hong, D. Stanek and R. Wood, "Characterization of the Read/Write Process for Magnetic Recording," *IEEE Trans. On Magnetics*, Vol. 31, No. 2, pp. 1071-1076, March 1995.

[4] D. Palmer, J. Coker, M. Meyer and P. Ziperovich, "Overwrite in Thin Media Measured by the Method of Pseudorandom Sequences," *IEEE Trans. On Magnetics, Vol.* 24, No. 6, pp. 3096-3098, November 1988.

[5] A. Taratorin, Characterization of Magnetic Recording Systems: A Practical Approach, Guzik Technical Enterprises, 1996.

[6] G. H. Lin, Y. Zhao and H. Neal Bertram, "Overwrite in Thin Film Disk Recording Systems," *IEEE Trans. On Magnetics, Vol.* 29, No. 6, pp. 4215-4223, November 1993.

[7] H. Muraoka, S. Ohki and Y. Nakamura, "Relationship between Overwrite and Transition Shift in Perpendicular Magnetic Recording," *IEEE Trans. On Magnetics*, Vol. 30, No. 6, pp. 4272-4274, November 1994.

[8] W. Zhu, J. Chen, D. Kaiser, J. Judy, D. Palmer, "Experimental Study of Signal Dependent Noise in Perpendicular Recording," *Journal of Applied Physics*, Vol. 93, No. 10, pp. 8582-8584, 15 May 2003.

[9] U.S. Pat. No. 6,208,477, entitled "Hard disk drive having a built-in self-test for measuring non-linear signal distortion," by inventors Robert Leslie Cloke and Patrick Lee James.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
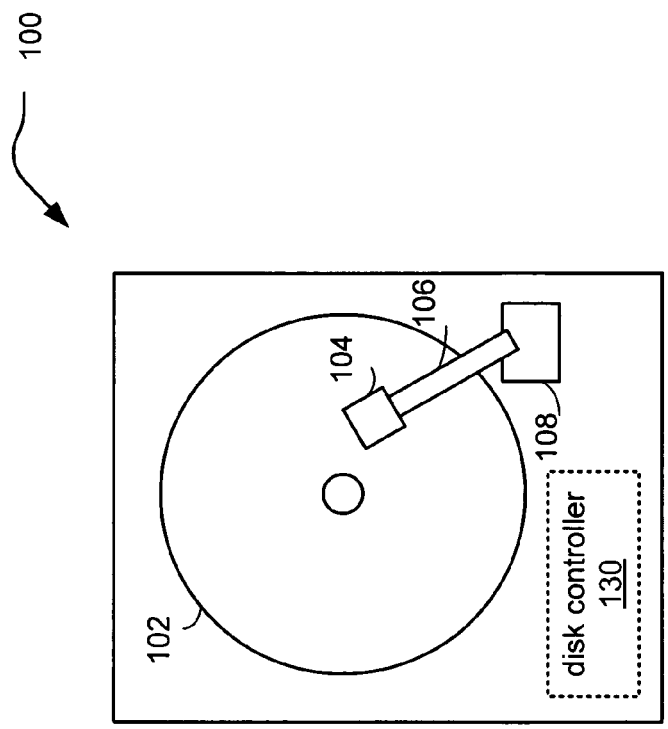
FIG. 1 illustrates an embodiment of a disk drive unit.

FIG. 1 illustrates an embodiment of a disk drive unit 100. In particular, disk drive unit 100 includes a disk 102 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 102 can be a magnetic disk that stores information as magnetic field changes on some type of magnetic medium. The medium can be a rigid or non-rigid, removable or non-removable, that consists of or is coated with magnetic material.

Disk drive unit 100 further includes one or more read/write heads 104 that are coupled to arm 106 that is moved by actuator 108 over the surface of the disk 102 either by translation, rotation or both. A disk controller 130 is included for controlling the read and write operations to and from the drive, for controlling the speed of the servo motor and the motion of actuator 108, and for providing an interface to and from the host device.

Figure 2:
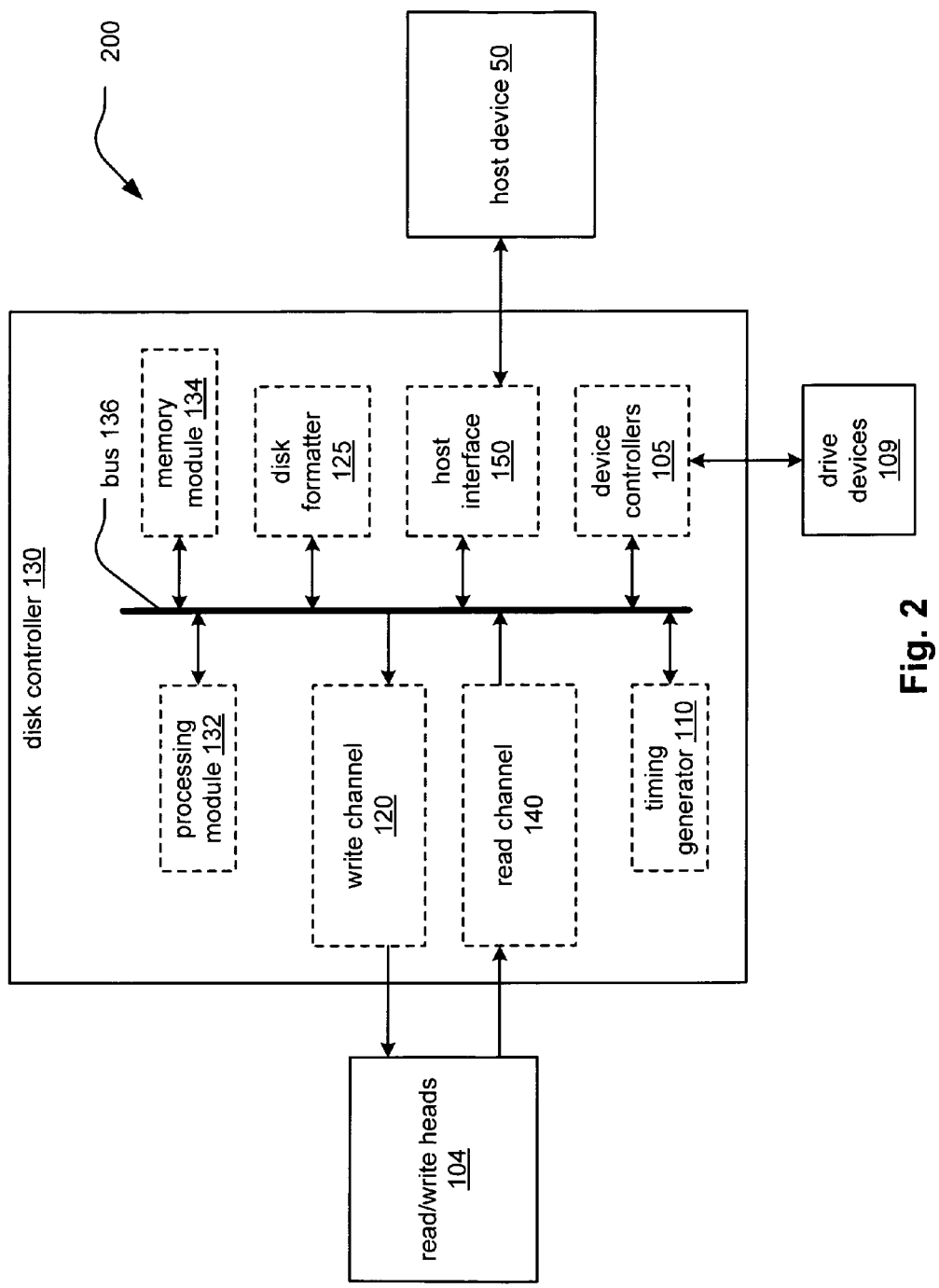
FIG. 2 illustrates an embodiment of a disk controller.

FIG. 2 illustrates an embodiment of a disk controller 130. Disk controller 130 includes a read channel 140 and write channel 120 for reading and writing data to and from disk 102 through read/write heads 104. Disk formatter 125 is included for controlling the formatting of disk drive unit 100, timing generator 110 provides clock signals and other timing signals, device controllers 105 control the operation of drive devices 109 such as actuator 108 and the servo motor, etc. Host interface 150 receives read and write commands from host device 50 and transmits data read from disk 102 along with other control information in accordance with a host interface protocol. In one possible embodiment of, the host interface protocol can include, SCSI, SATA, enhanced integrated drive electronics (EIDE), or any number of other host interface protocols, either open or proprietary, that can be used for this purpose.

Disk controller 130 further includes a processing module 132 and memory module 134. Processing module 132 can be implemented using one or more microprocessors, micro-controllers, digital signal processors (DSPs), microcomputers, central processing units (CPUs), field programmable gate arrays (FPGAs), programmable logic devices (PLAs), state machines, logic circuits, analog circuits, digital circuits, and/or any devices that manipulates signal (analog and/or digital) based on operational instructions that are stored in memory module 134. When processing module 132 is implemented with two or more devices, each device can perform the same steps, processes or functions in order to provide fault tolerance or redundancy. Alternatively, the function, steps and processes performed by processing module 132 can be split between different devices to provide greater computational speed and/or efficiency.

Memory module 134 may be a single memory device or a plurality of memory devices. Such a memory device may be a read-only memory (ROM), random access memory (RAM), volatile memory, non-volatile memory, static random access memory (SRAM), dynamic random access memory (DRAM), flash memory, cache memory, and/or any device that stores digital information. Note that when the processing module 132 implements one or more of its functions via a state machine, analog circuitry, digital circuitry, and/or logic circuitry, the memory module 134 storing the corresponding operational instructions may be embedded within, or external to, the circuitry comprising the state machine, analog circuitry, digital circuitry, and/or logic circuitry. Further note that, the memory module 134 stores, and the processing module 132 executes, operational instructions that can correspond to one or more of the steps or a process, method and/or function illustrated herein.

Disk controller 130 includes a plurality of modules, in particular, device controllers 105, processing timing generator 110, processing module 132, memory module 134, write channel 120, read channel 140, disk formatter 125, and host interface 150 that are interconnected via bus 136. Each of these modules can be implemented in hardware, firmware, software or a combination thereof, in accordance with the broad scope of the present invention. While the particular bus architecture is shown in FIG. 2 with a single bus 136, alternative bus architectures that include additional data buses, further connectivity, such as direct connectivity between the various modules, are likewise possible to implement additional features and functions.

In one possible embodiment, one or more modules of disk controller 130 are implemented as part of a system on a chip (SOC) integrated circuit. In such a possible embodiment, this SOC integrated circuit includes a digital portion that can include additional modules such as protocol converters, linear block code encoding and decoding modules, etc., and an analog portion that includes device controllers 105 and optionally additional modules, such as a power supply, etc. In an alternative embodiment, the various functions and features of disk controller 130 are implemented in a plurality of integrated circuit devices that communicate and combine to perform the functionality of disk controller 130.

Figure 3:
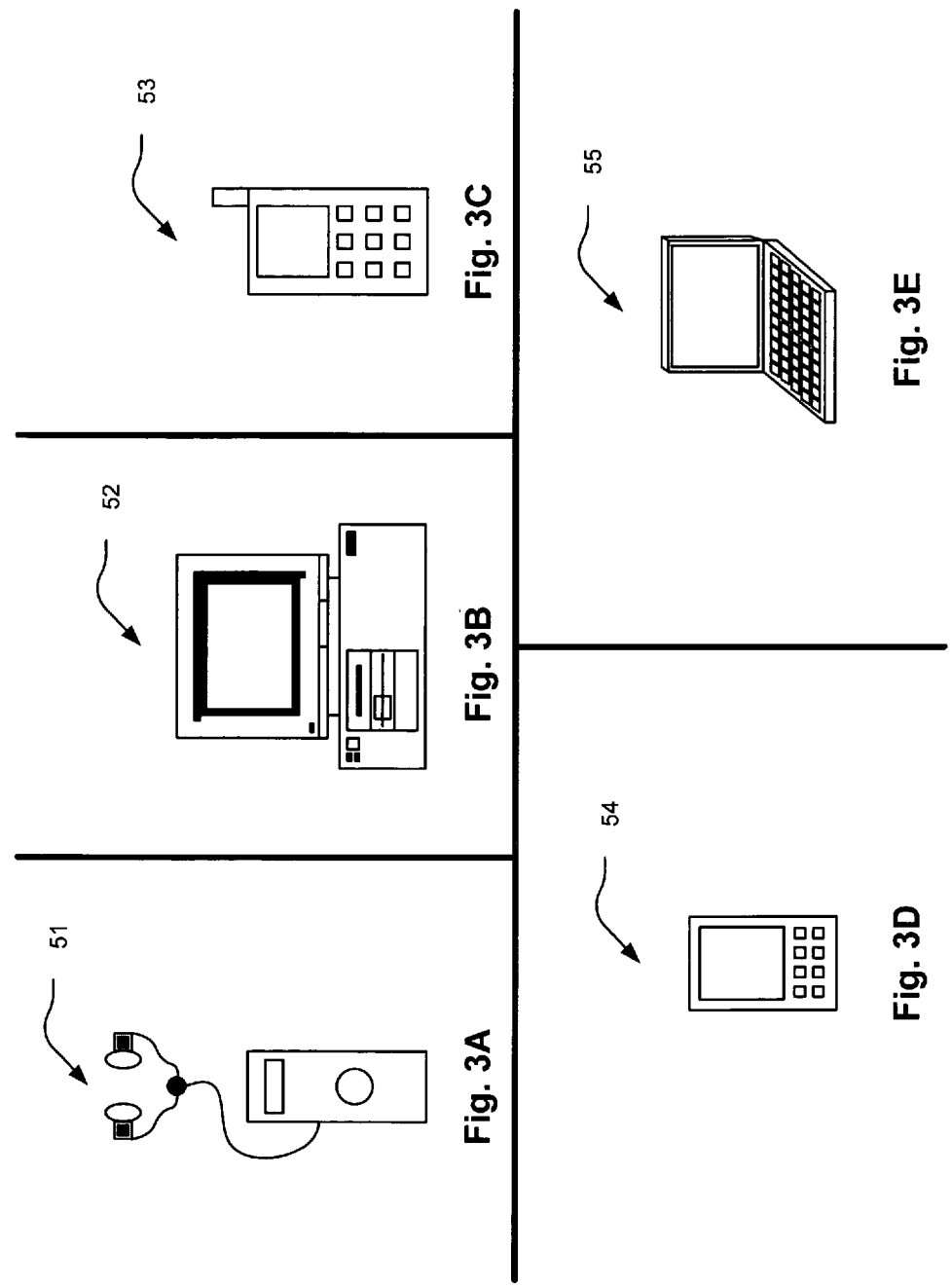
FIG. 3A illustrates an embodiment of a handheld audio unit.
FIG. 3B illustrates an embodiment of a computer.
FIG. 3C illustrates an embodiment of a wireless communication device.
FIG. 3D illustrates an embodiment of a personal digital assistant (PDA).
FIG. 3E illustrates an embodiment of a laptop computer.

FIG. 3A illustrates an embodiment of a handheld audio unit 51. In particular, disk drive unit 100 can be implemented in the handheld audio unit 51. In one possible embodiment, the disk drive unit 100 can include a small form factor magnetic hard disk whose disk 102 has a diameter 1.8" or smaller that is incorporated into or otherwise used by handheld audio unit 51 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 3B illustrates an embodiment of a computer 52. In particular, disk drive unit 100 can be implemented in the computer 52. In one possible embodiment, disk drive unit 100 can include a small form factor magnetic hard disk whose disk 102 has a diameter 1.8" or smaller, a 2.5" or 3.5" drive or larger drive for applications such as enterprise storage applications. Disk drive 100 is incorporated into or otherwise used by computer 52 to provide general purpose storage for any type of information in digital format. Computer 52 can be a desktop computer, or an enterprise storage devices such a server, of a host computer that is attached to a storage array such as a redundant array of independent disks (RAID) array, storage router, edge router, storage switch and/or storage director.

FIG. 3C illustrates an embodiment of a wireless communication device 53. In particular, disk drive unit 100 can be implemented in the wireless communication device 53. In one possible embodiment, disk drive unit 100 can include a small form factor magnetic hard disk whose disk 102 has a diameter 1.8" or smaller that is incorporated into or otherwise used by wireless communication device 53 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 53, emails, webpage information and other information downloaded from the Internet, address book information, and/or any other type of information that may be stored in a digital format.

In a possible embodiment, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide steaming audio and/or video programming. In this fashion, wireless communication device 53 can place and receive telephone calls, text messages such as emails, short message service (SMS) messages, pages and other data messages that can include attachments such as documents, audio files, video files, images and other graphics.

FIG. 3D illustrates an embodiment of a personal digital assistant (PDA) 54. In particular, disk drive unit 100 can be implemented in the personal digital assistant (PDA) 54. In one possible embodiment, disk drive unit 100 can include a small form factor magnetic hard disk whose disk 102 has a diameter 1.8" or smaller that is incorporated into or otherwise used by personal digital assistant 54 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 3E illustrates an embodiment of a laptop computer 55. In particular, disk drive unit 100 can be implemented in the laptop computer 55. In one possible embodiment, disk drive unit 100 can include a small form factor magnetic hard disk whose disk 102 has a diameter 1.8" or smaller, or a 2.5" drive. Disk drive 100 is incorporated into or otherwise used by laptop computer 52 to provide general purpose storage for any type of information in digital format.

As mentioned above, dibit extraction based on a periodic, maximal length, PN (pseudo-random noise) sequence is a highly flexible tool that can be used to identify many of the signals, noise, and nonlinear characteristics of a magnetic read/write channel.

In fact, it is possible to use the signal and noise dibits to find good approximations to zero forcing and minimum mean squared error (MSE) equalizers. Moreover, the first and second order statistics that can be easily derived from the signal and noise dibits can be used to calibrate/test data dependent noise predictive (DDNP) whitening filters and bias corrections. Dibit extraction/estimation can also be used to detect nonlinearities in the channel and in some cases provide accurate estimates of the nonlinearity. Based on the special mathematical properties of the PN sequence, the nonlinearities generally manifest themselves as echoes that occur at specific locations relative to the main dipulse in the extracted dibit. In some cases, dibit extraction can be used to minimize/compensate a given nonlinearity with an appropriate correction circuit. For example, dibit extraction can be used to calibrate write pre-compensation. Dibit extraction can also be used for manufacturing tests (e.g., measurement of overwrite).

Figure 4:
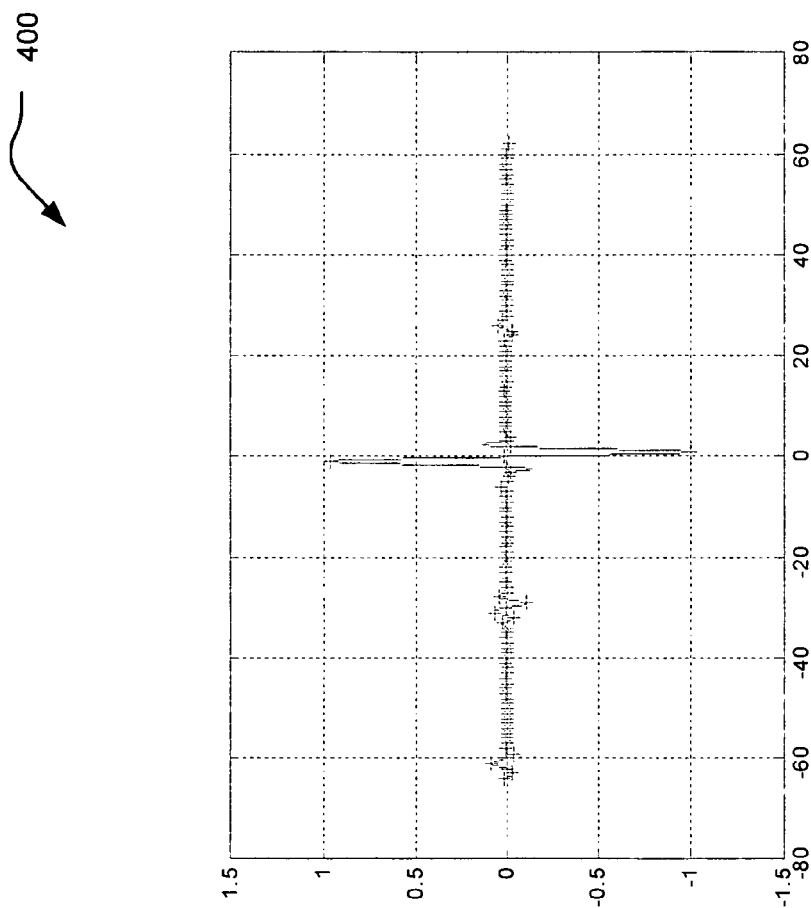
FIG. 4 illustrates an example of an extracted signal dibit equalized to PR4 (Partial Response 4: [1 0 –1]).

FIG. 4 illustrates an example of an extracted signal dibit equalized to PR4 (Partial Response 4: [1 0 −1]), as referenced by 400. The locations of various nonlinear echoes in the signal dibit are described in Table 1.

Dibit extraction is based on writing and then reading an integer number of periods of a maximal length PN sequence. The NRZ (Non-Return to Zero) write current is deconvolved from the data to obtain the "dibit response". It is quite common to use a length N=127 PN sequence based on the polynomial $x^7+x^4+1$. Note: To avoid edge effects, the "read" should be completely engulfed by the "write" so that the "read" is completely surrounded by the PN pattern.

Signal Dibit

The signal dibit is literally the dibit response of the equalized channel and is obtained by deconvolving the PN sequence write current from the equalized PN sequence data. It is also noted that sometimes the "signal dibit" is also referred to as merely or only "dibit".

Since multiple periods of the PN sequence data are usually accumulated, the extracted dibit values are, in fact, averaged over the multiple periods read into the dibit extraction circuit. Thus, the extracted signal dibit represents an averaged dibit response. In fact, the averaged, equalized PN sequence data is equal to the averaged signal dibit circularly convolved with the PN sequence write current, i.e., $$\hat{y}(k) = a_k \circledast \hat{d}^{(s)}(k), k=0, \ldots, 126 \quad \text{(EQ 1)}$$

where $\hat{y}(k)$ is an estimate of the mean value of the equalized PN pattern at position k, $a_k$ is the PN sequence write current (+1, −1), and $\hat{d}^{(s)}(k)$ is an estimate of the signal dibit. If $N_{per}$ periods of the PN sequence are accumulated in the dibit extraction circuit, then $$\hat{y}(k) = \frac{1}{N_{per}} \sum_{m=0}^{N_{per}-1} y(k+127m) \quad \text{(EQ 2)}$$

For the signal dibit, the input to the dibit extraction circuit is the instantaneous PN sample value, y(l), l=0:(127$N_{per}$−1), and the output is $\hat{d}^{(s)}(k)$ for a particular position, k. Only one position of the dibit is computed at a time. If one is only interested in the value of the extracted dibit at a particular position, then that is all that needs to be computed. For example, if one is interested in estimating the amount of nonlinear transition shift (NLTS), one might only compute one value or maybe a few values around +25 (see Table 1).

Noise Dibit

The "noise dibit" is somewhat of a misnomer, and it could be more correctly called the "noise correlation dibit", but the "noise dibit" name comes from the similarity it has with the "signal dibit". In particular, the relationship of the $j^{th}$ lag of the position dependent noise correlation to the $j^{th}$ noise dibit is given by $$\hat{r}_j(k) = a_k \circledast \hat{d}_j^{(n)}(k), \ k=0, \ldots, 126 \quad \text{(EQ 3)}$$

where $\hat{r}_j(k)$ is an estimate of the jth lag of the position dependent noise correlation and $\hat{d}_j^{(n)}(k)$ is the corresponding noise dibit. If $N_{per}$ periods of the PN sequence are used for the noise dibit extraction, then the jth lag of the position dependent noise correlation estimate at position k is given by $$\hat{r}_j(k) = \frac{1}{N_{per}} \sum_{m=0}^{N_{per}-1} n_{k+127m} n_{k+127m-j}, \quad \text{(EQ 4)}$$

$$k = 0, \ldots 126.$$

where $n_k = y_k - \hat{y}_k$ is the PN position dependent noise. For the jth lag noise dibit, the input to the dibit extraction circuit is the instantaneous jth lag noise correlation, $n_k n_{k-j}$, and the output is $\hat{d}_j^{(n)}(k)$ for a particular position, k.

The parallelism of the noise dibit with the signal dibit is evident in the previous four equations (EQ 1, EQ 2, EQ 3, and EQ 4). It is also evident from (EQ 1) and (EQ 3) that the "signal dibit" is associated with position dependent first order (mean value) statistics of the PN pattern and the "noise dibit" is associated with position dependent second order statistics (noise correlations). Note: Since this is in reference to positions in a known PN pattern, the statistics are in fact data dependent. In each case, the dibit extraction circuit provides an indirect way to find the time averaged, first and second order statistics. If the first or second order data dependent statistics are desired, they can be obtained by convolving the PN sequence write current with the appropriate dibit, see (EQ 1) or (EQ 3).

For a length 127 PN sequence, the 127×127 position (or data) dependent noise correlation matrix associated with the PN sequence is approximately a banded matrix with most of the interesting structure occurring in the 0-4$^{th}$ lags (the main diagonal and the first 4 off-diagonals). Consequently, $\hat{d}_j^{(n)}(k)$ only needs to be estimated for j=0:4.

Extracted signal and noise dibits provide a wealth of information that can be used to understand and improve the magnetic read/write channel. For more information see the References at the end of the DESCRIPTION OF RELATED ART section. NOTE: Dibit extraction is really a way of finding the channel response and could be used on any communications channel.

Figure 5:
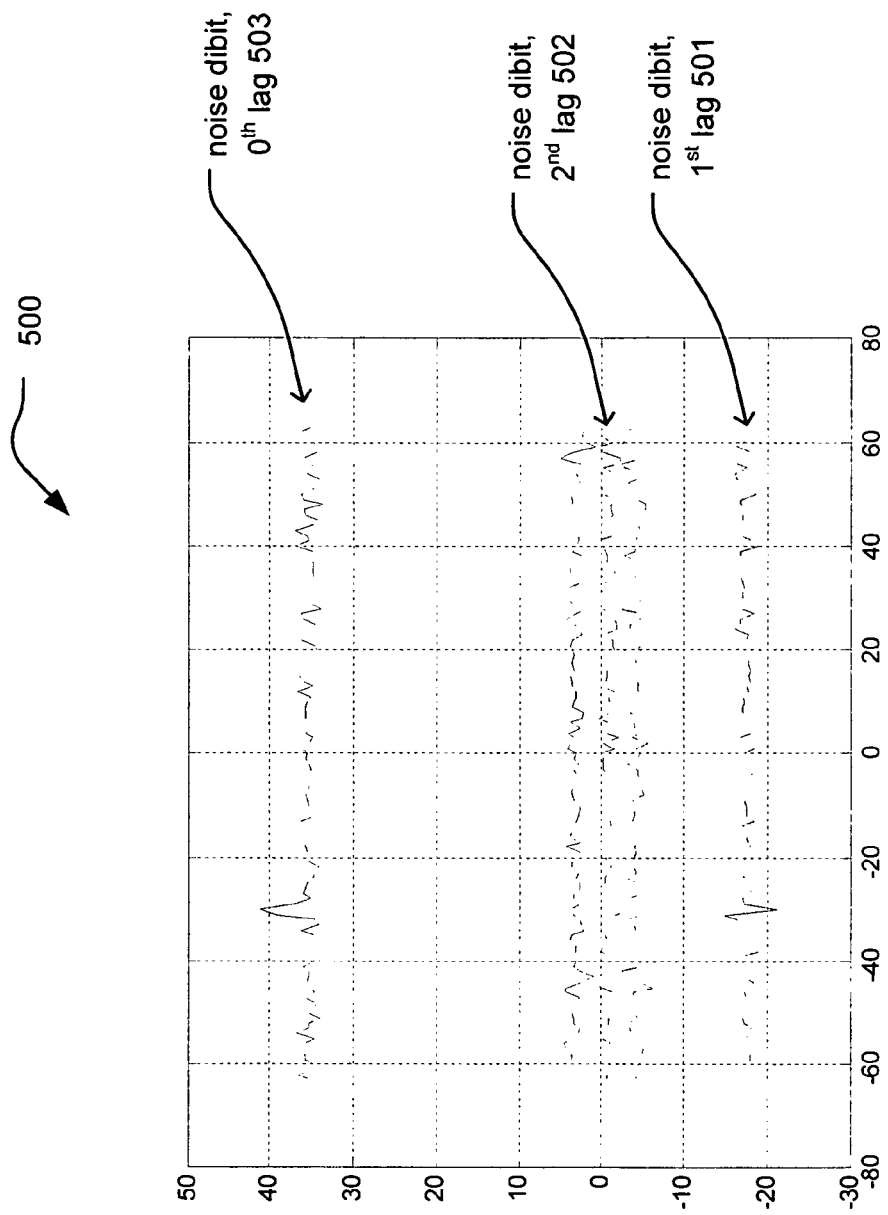
FIG. 5 illustrates an example of a PR4 noise dibit for lags 0-4.

FIG. 5 illustrates an example of a PR4 noise dibit for lags 0-4, as referenced by 500.

The peak at −31.5 in the 0$^{th}$ lag noise dibit (shown as noise dibit, 0$^{th}$ lag 503) indicates that transition noise is present.

One of the most important uses for noise dibits is to obtain data dependent noise statistics via (EQ 3). The noise dibits above were obtained from 32 periods of PN sequence data. Further smoothing/averaging could be accomplished by accumulating more periods. Table 2 contains the locations of some nonlinear echoes that may occur in the 0 lag noise dibit.

The noise dibit having lag of k−1 is shown as noise dibit, 1$^{st}$ lag 501, and the noise dibit having lag of k−2 is shown as noise dibit, 2$^{nd}$ lag 502.

Note: Although the "noise dibit" does not have a main dibit response like the signal dibit, it should be aligned with the signal dibit so that relative locations are with respect to the signal dibit alignment.

TABLE 1

Location of Some Nonlinear Echoes in the Signal Dibit

| Nonlinearity | Associated Nonlinear Term | Location Relative to Main Dibit Response For $x_n = x_{n-3} x_{n-7}$ with $x_0 = \ldots = x_6 = -1$ |
|---|---|---|
| NLTS, PE | $a_{k-1} a_k a_{k+1}$ | +25.5, +1.5 |
| NLTS2 | $a_{k-2} a_k a_{k+1}$ | −15 |
| HT | $a_k a_{k+1}$ | −30.5 |
| MR Asym. | $a_k a_{k-1}, a_k a_{k-2}, a_k a_{k-3}$ | −31.5, −61, −5.5 |
| MR Sat. | $a_{k-1} a_k a_{k+1}, a_{k-2} a_k a_{k+1}, a_{k-1} a_k a_{k+2}$ | +25.5, −13.5, +44.5 |

KEY:
NLTS = Nonlinear Transition Shift
NLTS2 = NLTS from 2 Bits Periods away
PE = Partial Erasure
HT = Hard Transition
MR = Magneto-Resistance
$a_k$ = NRZ write current (+1, −1) at time k

TABLE 2

Location of Some Nonlinear Echoes in the 0 lag Noise Dibit

| Nonlinear Echo | Relative Location For $x_n = x_{n-3} x_{n-7}$ with $x_0 = \ldots = x_6 = -1$ |
|---|---|
| Transition Noise | −31.5 |
| Supralinear Noise | −61 |
| Noise Diff. Between Pos. & Neg Transitions | 0 |
| Reader Asymmetry | −25.5 |

Finding the dibit response of the channel by deconvolving the PN sequence write current from the equalized PN pattern is somewhat difficult if done in a straightforward manner, but a novel means is presented by which the properties of the PN sequence write current may be used to simplify this computation. A brief summary of the simplification is given below. NOTE: In the previous section, $\hat{d}^{(s)}(k)$ is used to denote the signal dibit estimate at position k and $\hat{d}_j^{(n)}(k)$ to denote the jth lag noise dibit estimate at position k, but in this section, let h(k) denote the generic dibit response at time k. Also, we let y(k) generically represent the average signal response, $\hat{y}(k)$ or the average noise correlation response of the channel, $\hat{r}_j(k)$. Finally, we shall use u(k) to represent $a_k$, the input PN write current sequence.

NOTE: The following derivation results in a different and better implementation than the one described in U.S. Pat. No. 6,208,477. Previous industry practice and prior art (U.S. Pat. No. 6,208,477) use the correlation properties of the PN sequence write current to approximate the actual deconvolution sequence, but the approximation produces an incorrect DC boost on the extracted dibit. In the past, DC free longitudinal channels made the incorrect DC boost inconsequential. However, with non-DC free (perpendicular and noise) dibits, an incorrect DC offset in the extracted dibit requires some inconvenient post-processing to correct. With the deconvolution sequence found in the following derivation, the DC offset in the extracted dibit is correct and no post-processing is needed to correct the DC boost.

Derivation of the Simplified Dibit Extraction Approach

For the derivation of the simplified dibit extraction approach, let us define the following sequences for one PN period, k=1:(N−1), N=$2^b$−1 and b is an integer u(k)=the input PN sequence write current (with values, +1 and −1)

y(k)=the average response of the system to the PN input h(k)=the dibit response of the channel (or simply referred to as "dibit")

U(n)=DFT{u(k)}, the Discrete Fourier Transform, n=0:(N−1)

Y(n)=DFT{y(k)}

H(n)=DFT{h(k)}

To preserve the periodic nature of the data and its transform, the DFT length must equal the PN period length, N=$2^b$−1. It is typical to use a b=7 bit PN sequence with N=$2^7$−1=127.

The output is given by the circular convolution of the dibit response of the channel with the input, i.e., $$y(k) = h(k) \otimes u(k) \xleftrightarrow{DFT} Y(n) = H(n)U(n) \quad (EQ\ 5)$$

To find h(k), the input is deconvolved from the output, $$h(k) = y(k) \otimes v(k) \xleftrightarrow{DFT} H(n) = \frac{Y(n)}{U(n)} = Y(n)V(n) \quad (EQ\ 6)$$

where v(k)=IDFT{1/U(n)} is the deconvolution sequence in the time domain. It is convenient to rewrite V(n) in the frequency domain as $$V(n) = \frac{1}{U(n)} = \frac{U^*(n)}{|U(n)|^2} \quad (EQ\ 7)$$

Because the PN sequence u(k) is white (except for a DC offset), i.e., $$|U(n)|^2 = \begin{cases} 1 & n = 0 \\ N+1 & n \neq 0 \end{cases} \quad (EQ\ 8)$$

one can write $$\frac{1}{|U(n)|^2} = \left(\frac{1}{N+1}\right)(1 + N\delta(n)) = \begin{cases} 1 & n = 0 \\ 1/(N+1) & n \neq 0 \end{cases} \quad (EQ\ 9)$$

The deconvolution sequence in the frequency domain can now be written as $$V(n) = \frac{1}{U(n)} = \frac{U^*(n)}{|U(n)|^2} = \left(\frac{1}{N+1}\right)(1 + N\delta(n))U^*(n) \quad (EQ\ 10)$$

Where $$\delta(n) = \begin{cases} 1 & n = 0 \\ 0 & n \neq 0 \end{cases}.$$

Using the fact that $$u(-k) \xleftrightarrow{DFT} U^*(n),$$

$$\delta(k) \xleftrightarrow{DFT} 1,$$

$$1/N \xleftrightarrow{DFT} \delta(n)$$

and U*(0)=1, it is easy to see that the deconvolution sequence can be written in the time domain as $$v(k) = \left(\frac{1}{N+1}\right)(u(-k) + 1) \xleftrightarrow{DFT} V(n) = \left(\frac{1}{N+1}\right)(1 + N\delta(n))U^*(n). \quad (EQ\ 11)$$

Thus, one can see that the deconvolution sequence that "extracts" the dibit response from the channel output can be written as a simple function of the time-reversed PN sequence write current. Computational advantages can be made if v(k) is written in terms of the binary version of the PN sequence, i.e., $$v(k) = \frac{2}{N+1} u_{bin}(-k) \quad (EQ\ 12)$$

Where $u_{bin}(-k) \in (0,1)$ is a time reversed binary version of $u(k) \in (+1,-1)$. The binary and write current versions of the PN sequence are related as $u(k) = 2^*u_{bin}(k)-1$. Ignoring the scale factor, an unscaled version of the dibit response is extracted as $$\tilde{h}(k) = y(k) \otimes u_{bin}(-k) \quad (EQ\ 13)$$

For N=127, the properly scaled dibit response is given by $$h(k) = \frac{2}{N+1} \tilde{h}(k) = \frac{1}{64} \tilde{h}(k) \quad (EQ\ 14)$$

It should be noted that convolving with the time reversed PN binary sequence is equivalent to correlation with the non-reversed sequence. Writing the circular convolution explicitly (assuming all sequences have periodicity of period N) results in the following:

$$\tilde{h}(k) = y(k) \otimes u_{bin}(-k) = \sum_{m=0}^{N-1} y(m)u_{bin}((m-k) \bmod N). \quad (EQ\ 15)$$

Thus, the $k^{th}$ position of the (unscaled) dibit response is simply calculated by correlating the equalized channel output sequence with the binary version of the PN delayed by k bit periods. The "extracted dibit", $\tilde{h}(k)$, differs from the true dibit by a simple scale factor.

In most cases, the scaling is unnecessary, but if it is needed, the power-of-two scale factor, $2/(N+1)=2^{-b+1}$, can be trivially implemented with a "−b+1" bit shift.

It should be noted that prior art uses the correlation properties of the PN sequence write current sequence to approximate the deconvolution sequence. Specifically, prior art uses a "correlation" sequence $v_{priorArt}(k)=u(-k)=2^*u_{bin}(-k)-1 \in (+1,-1)$ instead of the actual deconvolution sequence, $v(k)=u_{bin}(-k) \in (1,0)$. The problem with $v_{priorArt}(k)$ is that it produces a DC boost in the dibit response. In the past, this was not a problem because the dibit response was DC free so that the DC boost was zeroed out, but with (non-DC free) perpendicular and noise dibits, the old method causes DC offset problems that have to be corrected with post-processing. See Appendix A for more details.

Figure 6:
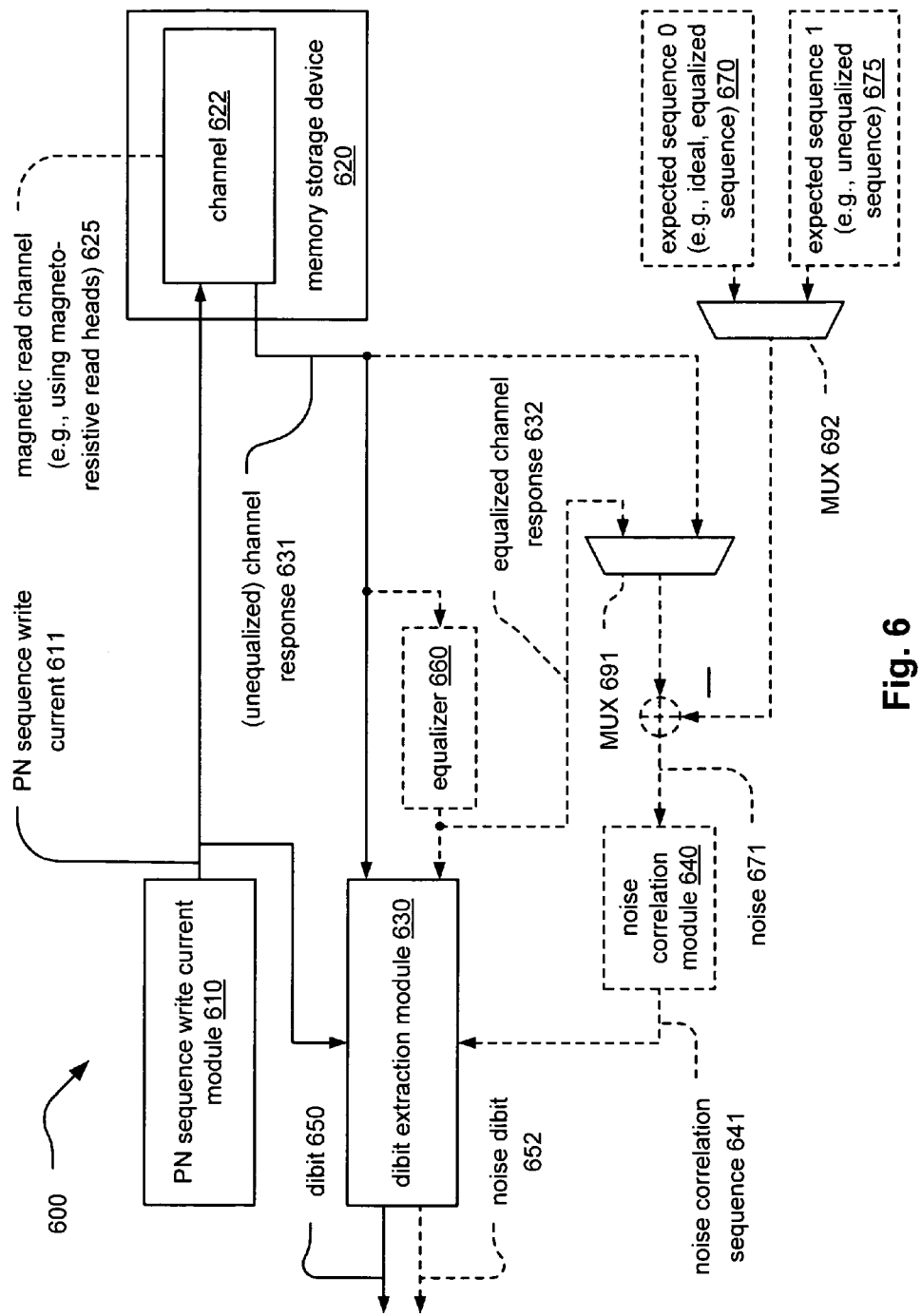
FIG. 6 illustrates an embodiment of an apparatus that is operable to perform dibit extraction.

FIG. 6 illustrates an embodiment of an apparatus 600 that is operable to perform dibit extraction. The apparatus 600 includes a PN (Pseudo-Noise) sequence write current module 610 that that is operable to provide a PN sequence write current to a channel 622 of a memory storage device 620. More details are provided herein regarding the characteristics of the PN sequence write current. Generally speaking, the PN sequence write current consists of values of +x and 0 where x is a selectable value. In many embodiments, x=1. The apparatus 600 also includes a dibit extraction module 630 that is operable to estimate a dibit 650 of the channel 622 by processing the PN sequence write current 611 and an (unequalized) channel response 631 or an equalized channel response 632 generated when providing the PN sequence write current to the channel. That is to say, the PN sequence write current 611 is provided to the channel 622, and the channel response 631 is output there from. This channel response 631 can also under equalization as well thereby generating the equalized channel response 632. The channel 622 of the memory storage device 620 can be viewed as being a magnetic read channel (e.g., a channel that employs magneto-resistive read heads) in some embodiments, as indicated using the reference numeral 625.

It is noted that the PN sequence write current module 610 and the dibit extraction module 630, or a singular processing module incorporating both of their respective functionality, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Each of the PN sequence write current module 610 and the dibit extraction module 630 can also be integrated into a single device which can be generally referred to as a processing module. A memory, holding operational instructions, can be communicatively coupled to one or both of the PN sequence write current module 610 and the dibit extraction module 630.

Such a memory may be a single memory device or a plurality of memory devices. Such a memory device may be a read-only memory, random access memory, volatile memory, non-volatile memory, static memory, dynamic memory, flash memory, and/or any device that stores digital information. Note that when such a processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

As mentioned above, within some embodiments, an equalizer 660 is operably situated to generate the equalized channel response 632 from the channel response 631. The dibit extraction module is thereby operable to perform dibit extraction of either the equalized channel response 632 or the (unequalized) channel response 631. Each of the equalized channel response 632 or the (unequalized) channel response 631 is provided to a MUX 691 to allow the appropriate selection between them for subsequent use as described below with respect to a noise correlation module 640.

As mentioned above, the same dibit extraction functionality can also be employed to perform noise dibit extraction, so long as the "noise dibit" is appropriately aligned with the signal dibit (or "dibit") so that relative locations are with respect to the signal dibit (or "dibit") alignment. That is to say, the same dibit extraction module 630 can be employed to perform noise dibit extraction using the same functionality as is required when performing dibit extraction.

However, a slightly modified sequence, namely a noise correlation sequence 641 derived from a PN input sequence, is determined within and provided from the noise correlation module 640. The noise correlation module 640 receives as input a term generally referred to as noise 671. There are at least 4 different types of "noise" that can be determined, as desired and selected within a particular application. For example, either an expected sequence 0 (e.g., ideal, equalized sequence) 670 or an expected sequence 1 (e.g., unequalized sequence) 671 can be selected using a MUX 692. In addition, either of the equalized channel response 632 or the (unequalized) channel response 631 can be selected using the MUX 691. Therefore, four different signals may be selected and employed and used as the noise 671 which is provided to the noise correlation module 640 in which the noise correlation sequence 641 is generated. These 4 signals are as follows:

1. difference between (unequalized) channel response 631 and expected sequence 0 (e.g., ideal, equalized sequence) 670

2. difference between equalized channel response 632 and expected sequence 0 (e.g., ideal, equalized sequence) 670

3. difference between (unequalized) channel response 631 and expected sequence 1 (e.g., expected, unequalized sequence) 671

4. difference between equalized channel response 632 and expected sequence 1 (e.g., expected, unequalized sequence) 671

In practice, the ideal, equalized sequence is the only "expected" sequence that is readily available for real-time processing so it is typically used as an approximation to the actual expected, equalized sequence 670. The biases between the ideal, equalized sequence and the expected equalized sequence can then be corrected offline in a post-processing step.

This noise correlation module 640 can also be incorporated into a singular processing module along with the PN sequence write current module 610 and the dibit extraction module 630, if desired. When operating in this mode, the dibit extraction module 630 is operable to extract a noise dibit 652 instead of a signal dibit.

Figure 7:
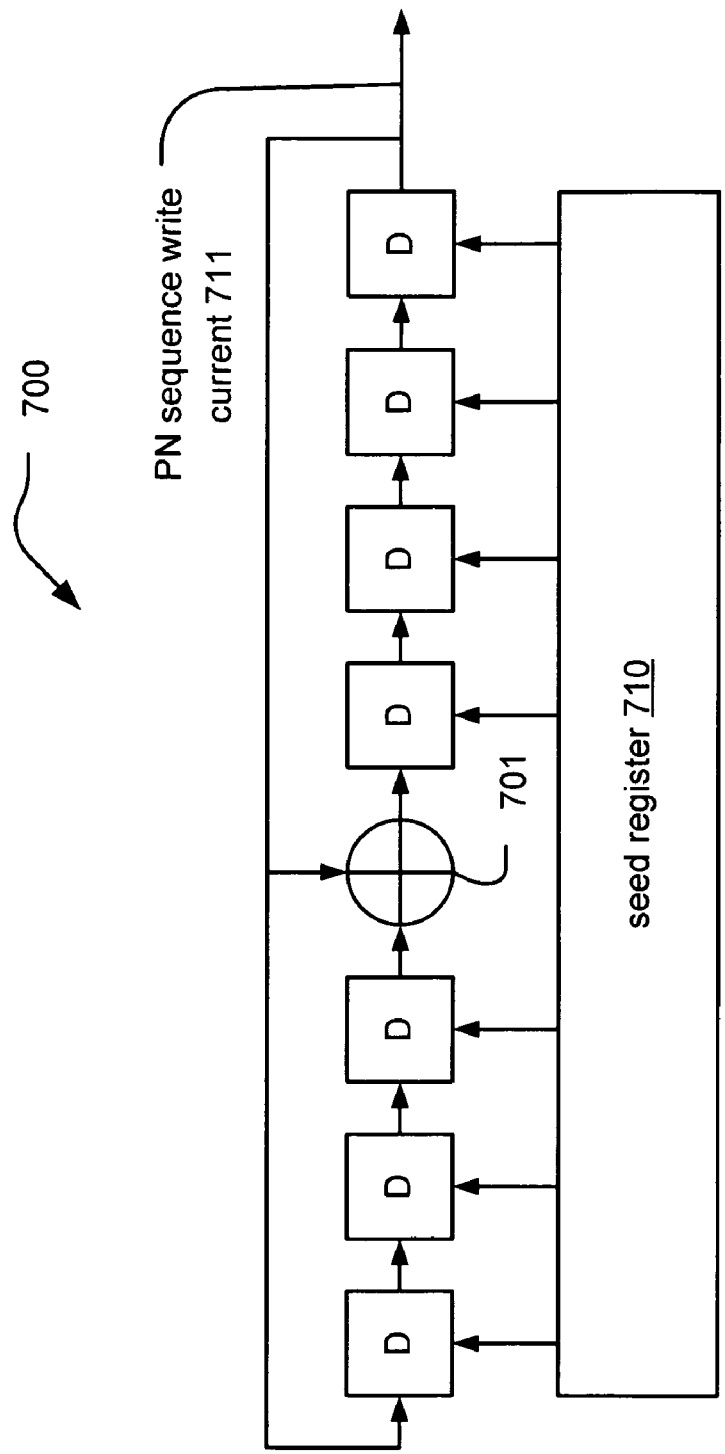
FIG. 7 illustrates an embodiment of a PN sequence write current module that employs the polynomial, $x^7+x^4+1$, using an LFSR (Linear Feedback Shift Register).

FIG. 7 illustrates an embodiment of a PN sequence write current module 700 that employs the polynomial, $x^7+x^4+1$, using an LFSR (Linear Feedback Shift Register). A seed register 710 provide a plurality of values to each of a plurality of delay elements (depicted in the diagram using "D"). Each of these delay elements, D, operates by providing the same delay. An adder 701 is also situated within the cascaded stream of delay elements, D, to provide feedback from the output of the PN sequence write current module 700 (shown as PN sequence write current 711) and to add in the output value. The output of the PN sequence write current module 700 (shown as PN sequence write current 711) is also fed back to the beginning of the cascaded stream of delay elements, D. Using this PN sequence write current module 700, the PN sequence write current 711 can generated. If desired, the PN sequence write current 711 can also be modified (i.e., by adding/subtracting a DC offset and/or scaling).

Figure 8:
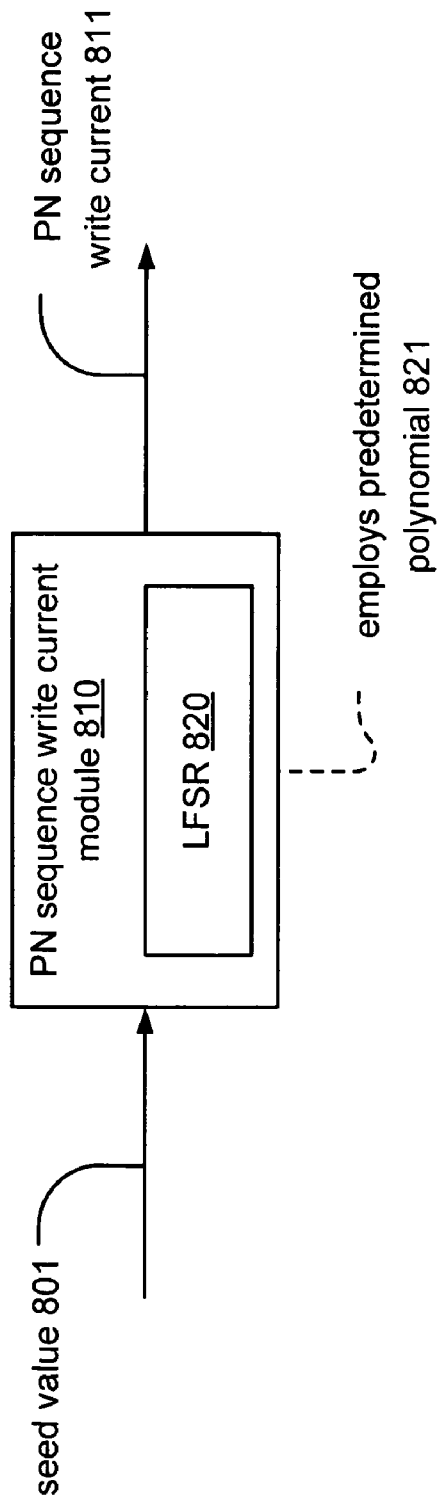
FIG. 8 illustrates another embodiment of a PN sequence write current module.

FIG. 8 illustrates another embodiment of a PN sequence write current module 810. While the embodiment of the PN sequence write current module 800 shows one possible manner in which a PN sequence write current may be generated, this diagram shows generally that an alternative embodiment of an LFSR 820 can also be employed that includes different delay elements, adders, etc. than the implementation depicted within the FIG. 7. A designer is provided a wide degree of flexibility and latitude to generate a PN sequence write current to be employed.

Generally speaking, a seed value 801 is provided to a PN sequence write current module 810 that employs an LFSR 820. Again, this LFSR 820 can be a different embodiment and implementation that that employed within the FIG. 7. The PN sequence write current module 810 employs a predetermined polynomial in generating a PN sequence write current 811. As a particular polynomial is employed as shown within the embodiment of the FIG. 7, an alternative polynomial can be employed as well as selected by a designer. However, for dibit extraction, the polynomial must produce a maximal length PN sequence. The dibit extractor depends on the special properties of the maximal length PN sequence.

The following 2 diagrams depict embodiments of dibit extraction modules that can be employed. While the resulting dibit should be comparable using either of the two approaches, these embodiments are simply shown as to provide the designer with even more latitude in the actual implementation of such a dibit extraction module.

Figure 9:
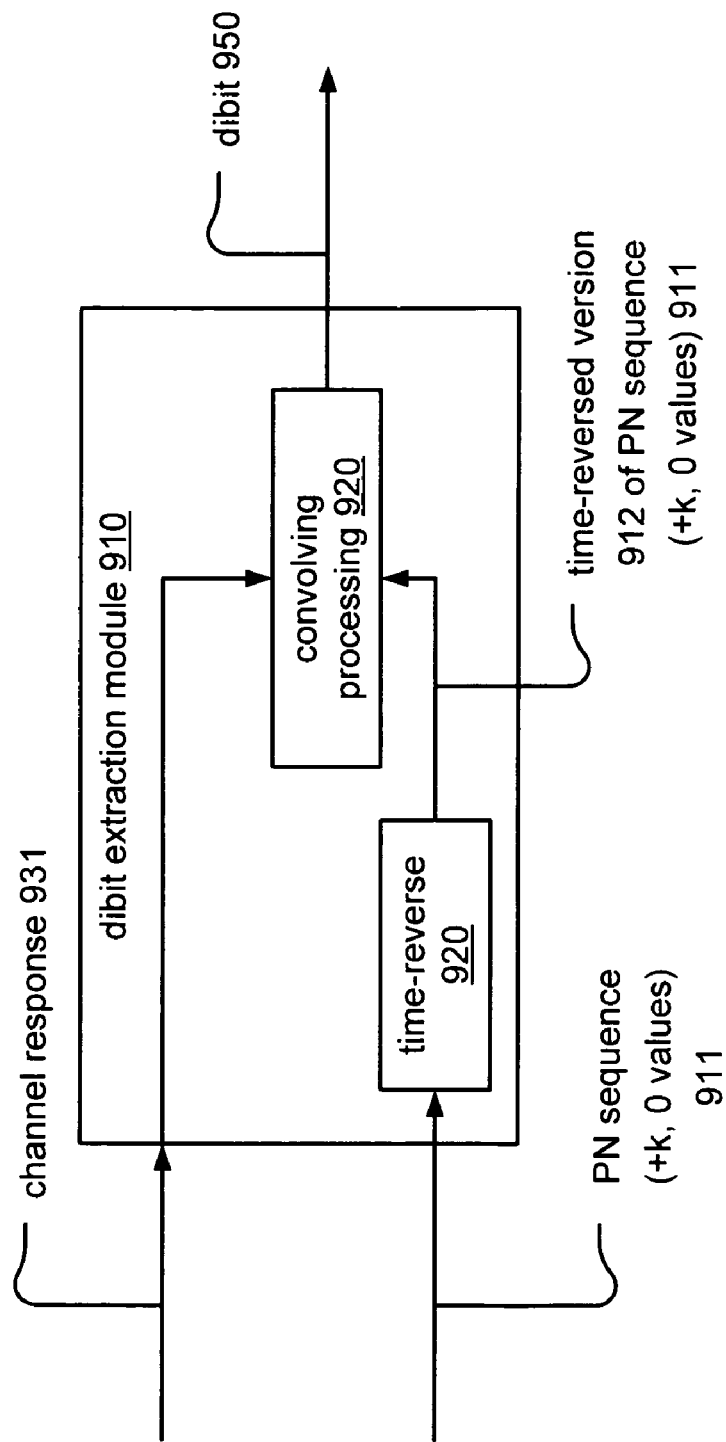
FIG. 9 illustrates an embodiment of a dibit extraction module.

FIG. 9 illustrates an embodiment of a dibit extraction module 910. A channel response 931 and a PN sequence (that consists of values of +k, 0, where k may be equal to 1 if desired) 911 are received by the dibit extraction module 910. The dibit extraction module 910 then generates a time-reversed version 912 of the PN sequence 911. The dibit extraction module 910 then performs convolving processing of the channel response 931 and the time-reversed version 912 of the PN sequence 911. After performing this convolving processing, a dibit 950 is extracted and output from the dibit extraction module 910.

Figure 10:
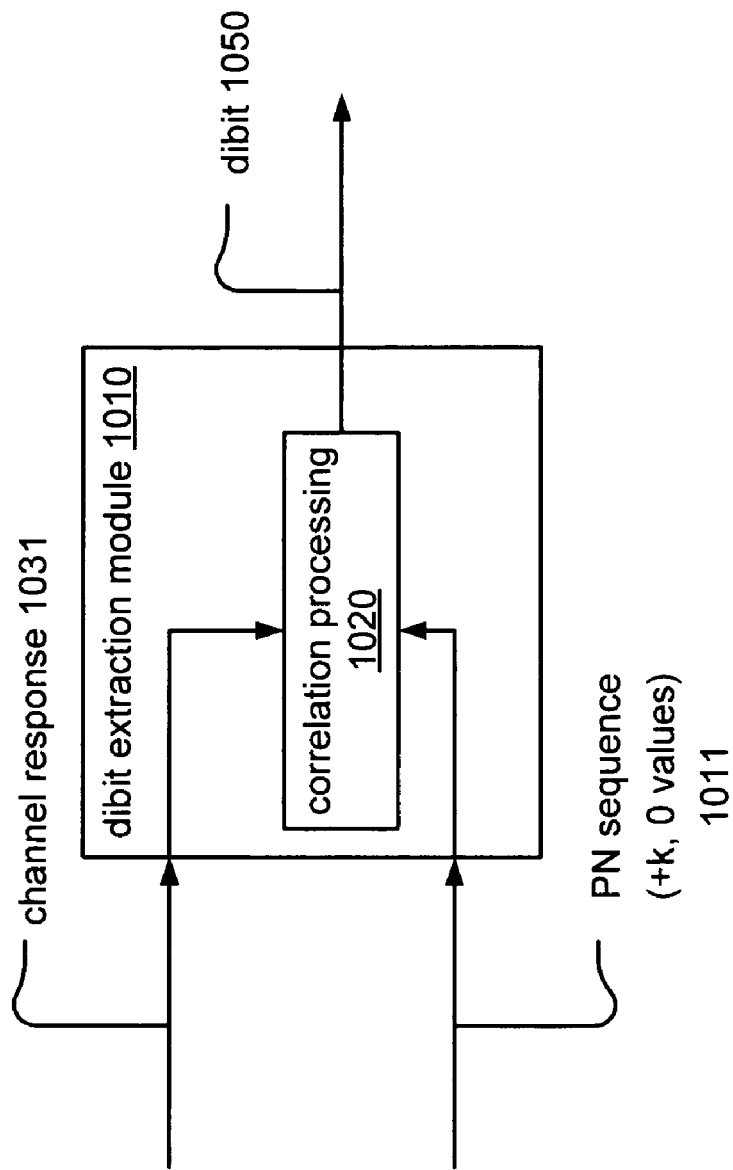
FIG. 10 illustrates another embodiment of a dibit extraction module.

FIG. 10 illustrates another embodiment of a dibit extraction module 1010. A channel response 1031 and a PN sequence (that consists of values of +k, 0, where k may be equal to 1 if desired) 1011 are received by the dibit extraction module 1010. The dibit extraction module 1010 then performs correlation processing (see 1020) of the channel response 1031 and the PN sequence 1011. After performing this correlation processing 1020, a dibit 1050 is extracted and output from the dibit extraction module 1010. Each of the dibit 1050 of the FIG. 10 and the dibit 950 of the FIG. 9 should be comparable for the same channel.

Figure 11:
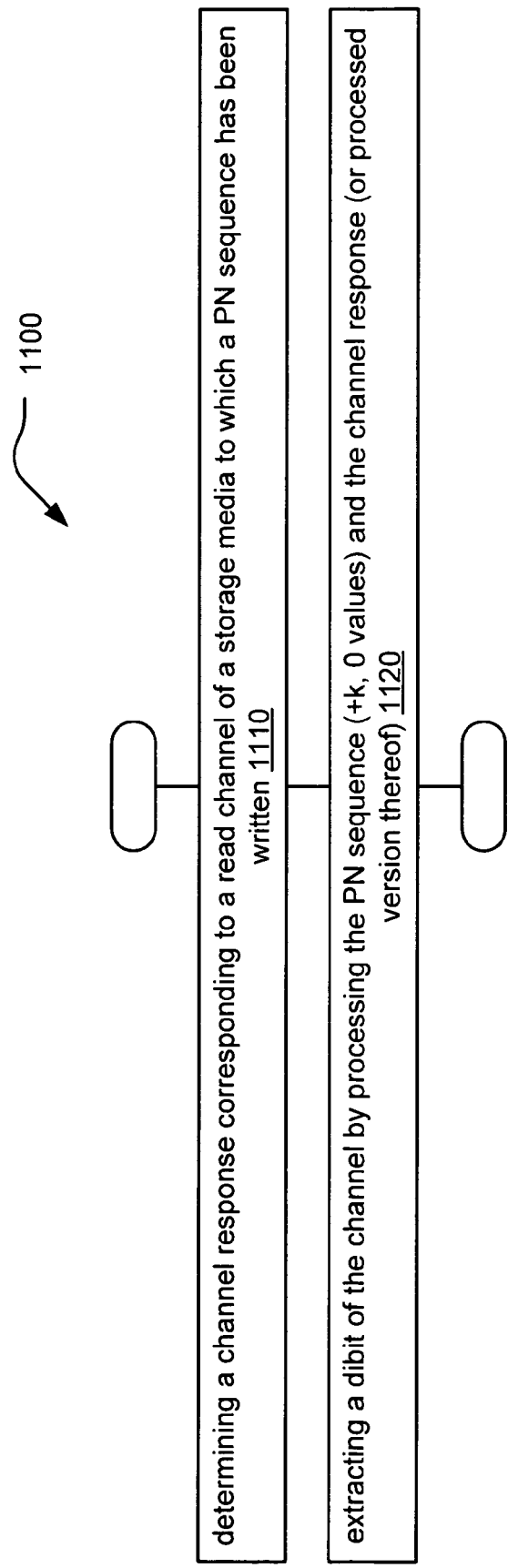
FIG. 11 illustrates an embodiment of another apparatus that is operable to perform dibit extraction.

FIG. 11 illustrates an embodiment of a method 1100 that is operable to perform dibit extraction. As shown in a block 1110, the method 1100 involves determining a channel response corresponding to a read channel of a storage media to which the PN (Pseudo-Noise) sequence has been written. The PN sequence, from which a corresponding analog write current and corresponding magnetization are generated, is a binary sequence that includes values of (+k, 0). The method 1100 then involves extracting a dibit of the channel by processing the PN sequence (+k, 0 values) and the channel response (or a processed version thereof). The dibit of the channel has a zero DC offset.

Figure 12:
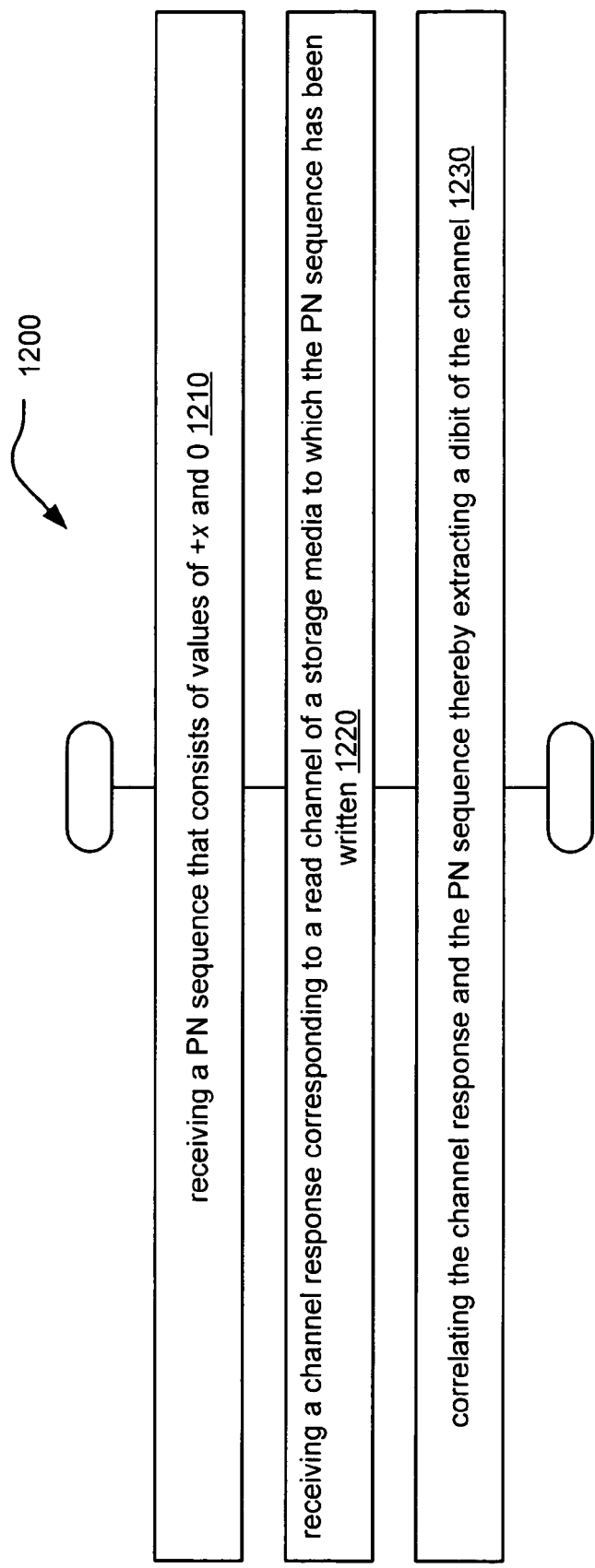
FIG. 12 illustrates an embodiment of a method that is operable to perform dibit extraction.

FIG. 12 illustrates another embodiment of a method 1200 that is operable to perform dibit extraction. As shown in a block 1210, the method 1200 involves receiving a PN sequence that consists of values of +x and 0. This PN sequence, from which a corresponding analog write current and corresponding magnetization are generated, is a binary sequence that includes values of (+x, 0). Then, the method 1200 involves receiving a channel response corresponding to a read channel of a storage media to which the PN sequence has been written, as shown in a block 1220. The method 1200 then involves correlating the channel response and the PN sequence thereby extracting a dibit of the channel, as shown in a block 1230.

Figure 13:
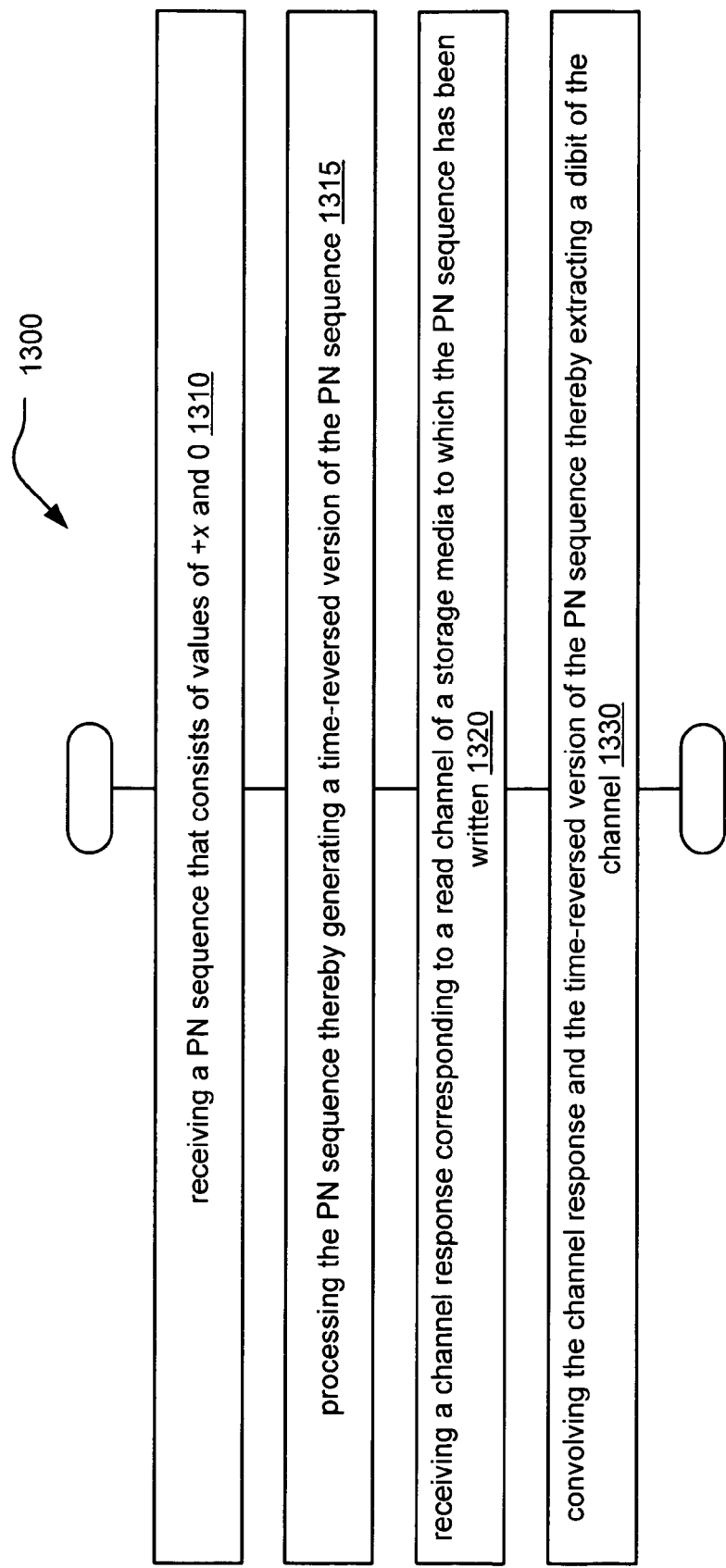
FIG. 13 illustrates another embodiment of a method that is operable to perform dibit extraction.

FIG. 13 illustrates another embodiment of a method 1300 that is operable to perform dibit extraction. As shown in a block 1310, the method 1300 involves receiving a PN sequence that consists of values of +x and 0. Again, such a PN sequence, from which a corresponding analog write current and corresponding magnetization are generated, is a binary sequence that includes values of (+x, 0). Then, the method 1300 involves processing the PN sequence thereby generating a time-reversed version of the PN sequence, as shown in a block 1315. The method 1300 involves receiving a channel response corresponding to a read channel of a storage media to which the PN sequence has been written, as shown in a block 1320. The method 1300 then involves convolving the channel response and the time-reversed PN sequence thereby extracting a dibit of the channel, as shown in a block 1330.

Figure 14:
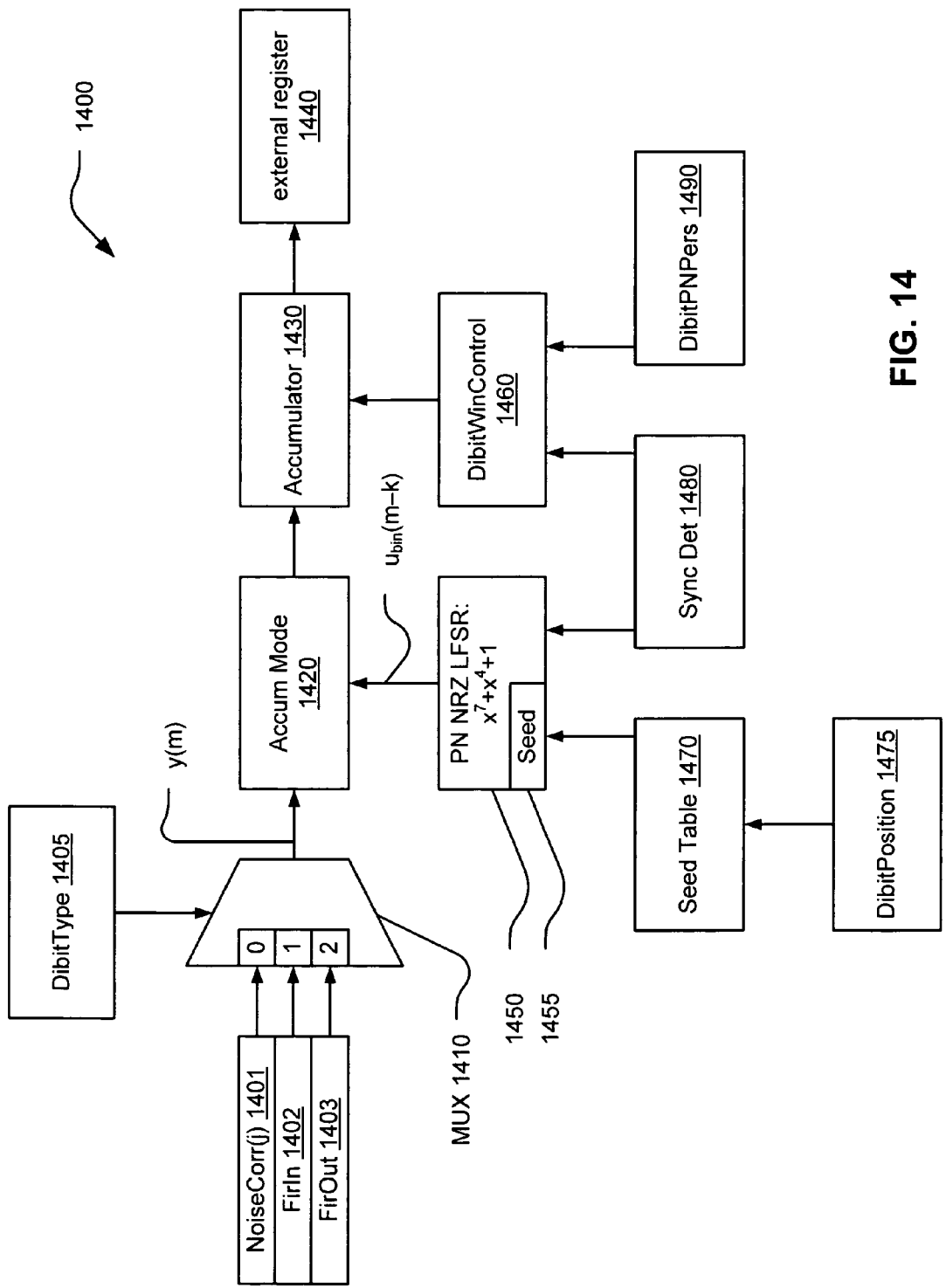
FIG. 14 illustrates another embodiment of a method that is operable to perform dibit extraction.

FIG. 14 illustrates an embodiment of another apparatus 1400 that is operable to perform dibit extraction. When implementing an apparatus to perform estimation, there are several important simplifications that should be mentioned. The first is that only one lag of $\tilde{h}(k)$ can be measured at a time (i.e., per read gate). Another simplification is that the 'time shifted' sequence $u_{bin}(m-k)$, m=0: N−1 doesn't need to be physically delayed because a shifted version can be generated by simply loading an appropriate seed into an LFSR (Linear Feedback Shift Register) (e.g., as shown using reference numeral 1450) that is started at Sync Detect, as shown using reference numeral 1480. A third implementation simplification is that good noise averaging is achieved by simply accumulating for multiple periods, i.e., a scaled dibit lag can be created by expanding the sum to include c periods, i.e., $$\tilde{h}(k) = \sum_{m=0}^{cN-c} y(m)u_{bin}(m-k) \tag{EQ 16}$$

Typical industry practice is to use a period N=127 PN sequence. Thus, accumulating for c=32 periods requires 127*32=4064 samples. Of course, this means that the properly scaled dibit is now given by $$h(k) = \frac{2}{c(N+1)}\tilde{h}(k) = \frac{1}{64c}\tilde{h}(k) \tag{EQ 17}$$

It is important that exactly an integer number of periods be accumulated. It is also important that the PN sequence data that is accumulated avoids edge effects. In other words, the written PN sequence data must extend beyond (both before and after) the accumulated data.

TABLE 3

Control Registers and Bits (For Dibit Extraction Circuit)

| Reference numeral in FIG. 14 | Register/Bit Name | # of Bits | Description |
| --- | --- | --- | --- |
| 1475 | DibitPosition | 7 | Selects Dibit Position to be Accumulated |
|  | NoiseCorrLag | 3 | Selects the Noise Corr Lag, j |

TABLE 3-continued

Control Registers and Bits (For Dibit Extraction Circuit)

| Reference numeral in FIG. 14 | Register/Bit Name | # of Bits | Description |
|---|---|---|---|
| 1405 | DibitType | 2 | 2: Eq Sig Dibit, 1: Uneq Sig Dibit or 0: Noise Dibit |
| 1460 | DibitWinControl | 1 | 1: Accumulate, 0: Do Not Accumulate |
| 1490 | DibitPNPers | 2 | 1, 8, 16 or 32 PN Periods |

Some key implementation points are:
1. The Accumulation Mode, shown using reference numeral 1420, is simple:
   a. When the PN bit is 1, add the y(m) to the accumulator, shown using reference numeral 1430.
   b. When the PN bit is 0, DO NOT add y(m).
2. The DibitIn signal and the PN output must be started synchronously with Sync Detect 1480. They must have exactly the same alignment every time with Sync Detect 1480.
3. The accumulation window must accumulate exactly an integer number of periods.
4. The accumulation window must NOT start with the first sample after sync mark. The accumulation window must avoid edge effects with a recommended delay of at least 7 bits. To avoid edge effects at the beginning and ending, additional PN bits must be written. At a minimum, there should be at least 7 PN bits (periodically extended) written before and after the PN bits that are actually accumulated. In other words, exactly an integer number of periods must be accumulated, but the written PN sequence must exceed this by at least 14 bits.
5. Based on the previous two points, the DibitWinControl bit, shown using reference numeral 1460, should be activated at least Npad=7 bits after Sync Data edge transition, shown using reference numeral 1480, is true and should remain active for exactly 1, 8, 16, or 32 PN periods depending on what the two bit control register DibitPNPers indicates (one PN period is 127 bits). This assumes that the PN pattern is written immediately after Sync Mark. Because Npad PN bits are to be written before accumulation begins, the written PN pattern should be generated with a seed that is Npad positions before the center position of 0. This should provide the proper PN padding before DibitWinControl, shown using reference numeral 1460, goes active and also center the resultant extracted dibit. For Npad=7, the seed for generating the written PN is given by [0 1 0 1 1 0 1].

NOTE: For comparison, the Accumulation Mode, shown using reference numeral 1420, for prior art can be implemented as follows:
(1) When the PN bit is 1, add the y(m) to the accumulator.
(2) When the PN bit is 0, subtract y(m) from the accumulator. This is equivalent to, but not exactly the way the prior art was implemented. See Appendix A for a more complete comparison.

The input to the dibit extraction circuit might consist of equalized data (FirOut), unequalized data (FirIn), or noise correlation data with a lag of j (NoiseCorr(j)), shown using the reference numerals 1403, 1402, and 1401, respectively. The corresponding outputs would be the equalized signal dibit, the unequalized signal dibit and the noise dibit of lag j.

A canonic implementation of the LFSR to generate the PN sequence for the polynomial, $x^7+x^4+1$, (or alternatively represented as x^7+x^4+1) is shown in FIG. 8 (alternate implementations are possible). In fact, the PN sequence can be generated directly without using a LUT (Look-Up Table) approach simply by selectively delaying a first PN sequence at desired locations thereby generating a second PN sequence. However, if desired, a LUT approach can always be employed (though it may require more memory and therefore incur a greater cost than some other approach by which the PN sequence is generated using some function that merely operates on a selected seed value.

Test Vectors for the PN LSFR:

$$\text{Seed} = [1\ 0\ 0\ 0\ 0\ 0\ 0]$$

$$u_{NRZ}(k=0:126) = \begin{bmatrix} 0 & 0 & 0 & 0 & 0 & 0 & 1 & 0 & 0 & 0 & 1 & 0 & 0 & 1 & 1 & 0 \\ 0 & 0 & 1 & 0 & 1 & 1 & 1 & 0 & 1 & 0 & 1 & 1 & 0 & 1 & 1 & 0 \\ 0 & 0 & 0 & 0 & 1 & 1 & 0 & 0 & 1 & 1 & 0 & 1 & 0 & 1 & 0 & 0 \\ 1 & 1 & 1 & 0 & 0 & 1 & 1 & 1 & 1 & 0 & 1 & 1 & 0 & 1 & 0 & 0 \\ 0 & 0 & 1 & 0 & 1 & 0 & 1 & 0 & 1 & 1 & 1 & 1 & 1 & 0 & 1 & 0 \\ 0 & 1 & 0 & 1 & 0 & 0 & 0 & 1 & 1 & 0 & 1 & 1 & 1 & 0 & 0 & 0 \\ 1 & 1 & 1 & 1 & 1 & 1 & 1 & 0 & 0 & 0 & 0 & 1 & 1 & 1 & 0 & 1 \\ 1 & 1 & 1 & 0 & 0 & 1 & 0 & 1 & 1 & 0 & 0 & 1 & 0 & 0 & 1 \end{bmatrix}$$

In one sense, the actual time alignment and/or delay of the PN sequence is not important, because changing the initial seed changes the effective delay/alignment of the dibit, i.e., any alignment can be achieved with a proper choice of seed 1455. However, the output of the LFSR 1450 and the incoming DibitIn data must be synchronized with each other relative to Sync Detect so that every time Sync is detected, the relative alignments are the same. For example, it is not acceptable if sometimes the DibitIn data is shifted by one bit and other times it is not. On the other hand, if it is decides to produce a centered dibit, then all the alignments must be correct.

To compute the extracted dibit at various positions, a seed table can be generated that maps DibitPosition, k, onto the proper seed. The seed table may be implemented in firmware or hardware. An example of a seed table is given in Table 4. Again, it is noted that such a seed table not necessarily be stored in memory, but could be generated, in real time, as needed to support an apparatus performing dibit extraction.

It is desirable to construct the seed table so that the resultant "extracted dibit" is centered (as shown in FIG. 4). This means that the seed used to write the PN sequence and the seed table must be properly shifted (rotated) to center the extracted dibit. The seed table below was used in simulations with a written PN sequence that had an initial seed of [0 1 0 1 0 0 0] (corresponding to a centered DibitPosition=0), but in the chip the design should pad the written PN sequence with at least 7 PN bits (periodically extended) at the beginning and the end, so either the seed table or the written PN seed will have to be rotated to achieve the same centered dibit. It is probably easier to rotate the written PN pattern with a +7 position and a seed of [1 1 1 1 1 0 1] to introduce a pad of 7 bits. In the end, if a centered dibit is desired, the proper choice of seeds should be verified. Note: Because of the group delay of the FIR, the unequalized signal dibit will have a different offset than the equalized dibit. The equalized signal and noise dibits should all have the same mapping of DibitPosition to Seed value. An offset in the DibitPosition for the unequalized case should allow us to center the unequalized dibit, but this offset would be somewhat variable, so the best solution is simply to center the equalized dibit for PR4 and let the unequalized dibit have an offset (that could be corrected in firmware, if desired). If desired, a programmable offset of +5 to −5 (actually, +3 to −3 might be enough) can be employed, and this can be used to center the unequalized dibit.

TABLE 4

Mapping the DibitPosition into the Proper Seed

| DibitPosition, k | Seed |
|---|---|
| −63 | 1 0 0 0 0 0 0 |
| −62 | 0 0 1 0 0 0 1 |
| −61 | 0 1 0 0 0 1 0 |
| −60 | 1 0 0 0 1 0 0 |
| −59 | 0 0 1 1 0 0 1 |
| −58 | 0 1 1 0 0 1 0 |
| −57 | 1 1 0 0 1 0 0 |
| −56 | 1 0 1 1 0 0 1 |
| −55 | 0 1 0 0 0 1 1 |
| −54 | 1 0 0 0 1 1 0 |
| −53 | 0 0 1 1 1 0 1 |
| −52 | 0 1 1 1 0 1 0 |
| −51 | 1 1 1 0 1 0 0 |
| −50 | 1 1 1 1 0 0 1 |
| −49 | 1 1 0 0 0 1 1 |
| −48 | 1 0 1 0 1 1 1 |
| −47 | 0 1 1 1 1 1 1 |
| −46 | 1 1 1 1 1 1 0 |
| −45 | 1 1 0 1 1 0 1 |
| −44 | 1 0 0 1 0 1 1 |
| −43 | 0 0 0 0 1 1 1 |
| −42 | 0 0 0 1 1 1 0 |
| −41 | 0 0 1 1 1 0 0 |
| −40 | 0 1 1 1 0 0 0 |
| −39 | 1 1 1 0 0 0 0 |
| −38 | 1 1 1 0 0 0 1 |
| −37 | 1 1 1 0 0 1 1 |
| −36 | 1 1 1 0 1 1 1 |
| −35 | 1 1 1 1 1 1 1 |
| −34 | 1 1 0 1 1 1 1 |
| −33 | 1 0 0 1 1 1 1 |
| −32 | 0 0 0 1 1 1 1 |
| −31 | 0 0 1 1 1 1 0 |
| −30 | 0 1 1 1 1 0 0 |
| −29 | 1 1 1 1 0 0 0 |
| −28 | 1 1 0 0 0 0 1 |
| −27 | 1 0 1 0 0 1 1 |
| −26 | 0 1 1 0 1 1 1 |
| −25 | 1 1 0 1 1 1 0 |
| −24 | 1 0 0 1 1 0 1 |
| −23 | 0 0 0 1 0 1 1 |
| −22 | 0 0 1 0 1 1 0 |
| −21 | 0 1 0 1 1 0 0 |
| −20 | 1 0 1 1 0 0 0 |
| −19 | 0 1 0 0 0 0 1 |
| −18 | 1 0 0 0 0 1 0 |
| −17 | 0 0 1 0 1 0 1 |
| −16 | 0 1 0 1 0 1 0 |
| −15 | 1 0 1 0 1 0 0 |
| −14 | 0 1 1 1 0 0 1 |
| −13 | 1 1 1 0 0 1 0 |
| −12 | 1 1 1 0 1 0 1 |
| −11 | 1 1 1 1 0 1 1 |
| −10 | 1 1 0 0 1 1 1 |
| −9 | 1 0 1 1 1 1 1 |
| −8 | 0 1 0 1 1 1 1 |
| −7 | 1 0 1 1 1 1 0 |
| −6 | 0 1 0 1 1 0 1 |
| −5 | 1 0 1 1 0 1 0 |
| −4 | 0 1 0 0 1 0 1 |
| −3 | 1 0 0 1 0 1 0 |
| −2 | 0 0 0 0 1 0 1 |
| −1 | 0 0 0 1 0 1 0 |
| 0 | 0 0 1 0 1 0 0 |
| 1 | 0 1 0 1 0 0 0 |
| 2 | 1 0 1 0 0 0 0 |
| 3 | 0 1 1 0 0 0 1 |
| 4 | 1 1 0 0 0 1 0 |
| 5 | 1 0 1 0 1 0 1 |
| 6 | 0 1 1 1 0 1 1 |
| 7 | 1 1 1 0 1 1 0 |

TABLE 4-continued

Mapping the DibitPosition into the Proper Seed

| DibitPosition, k | Seed |
|---|---|
| 8 | 1 1 1 1 1 0 1 |
| 9 | 1 1 0 1 0 1 1 |
| 10 | 1 0 0 0 1 1 1 |
| 11 | 0 0 1 1 1 1 1 |
| 12 | 0 1 1 1 1 1 0 |
| 13 | 1 1 1 1 1 0 0 |
| 14 | 1 1 0 1 0 0 1 |
| 15 | 1 0 0 0 0 1 1 |
| 16 | 0 0 1 0 1 1 1 |
| 17 | 0 1 0 1 1 1 0 |
| 18 | 1 0 1 1 1 0 0 |
| 19 | 0 1 0 1 0 0 1 |
| 20 | 1 0 1 0 0 1 0 |
| 21 | 0 1 1 0 1 0 1 |
| 22 | 1 1 0 1 0 1 0 |
| 23 | 1 0 0 0 1 0 1 |
| 24 | 0 0 1 1 0 1 1 |
| 25 | 0 1 1 0 1 1 0 |
| 26 | 1 1 0 1 1 0 0 |
| 27 | 1 0 0 1 0 0 1 |
| 28 | 0 0 0 0 0 1 1 |
| 29 | 0 0 0 0 1 1 0 |
| 30 | 0 0 0 1 1 0 0 |
| 31 | 0 0 1 1 0 0 0 |
| 32 | 0 1 1 0 0 0 0 |
| 33 | 1 1 0 0 0 0 0 |
| 34 | 1 0 1 0 0 0 1 |
| 35 | 0 1 1 0 0 1 1 |
| 36 | 1 1 0 0 1 1 0 |
| 37 | 1 0 1 1 1 0 1 |
| 38 | 0 1 0 1 0 1 1 |
| 39 | 1 0 1 0 1 1 0 |
| 40 | 0 1 1 1 1 0 1 |
| 41 | 1 1 1 1 0 1 0 |
| 42 | 1 1 0 0 1 0 1 |
| 43 | 1 0 1 1 0 1 1 |
| 44 | 0 1 0 0 1 1 1 |
| 45 | 1 0 0 1 1 1 0 |
| 46 | 0 0 0 1 1 0 1 |
| 47 | 0 0 1 1 0 1 0 |
| 48 | 0 1 1 0 1 0 0 |
| 49 | 1 1 0 1 0 0 0 |
| 50 | 1 0 0 0 0 0 1 |
| 51 | 0 0 1 0 0 1 1 |
| 52 | 0 1 0 0 1 1 0 |
| 53 | 1 0 0 1 1 0 0 |
| 54 | 0 0 0 1 0 0 1 |
| 55 | 0 0 1 0 0 1 0 |
| 56 | 0 1 0 0 1 0 0 |
| 57 | 1 0 0 1 0 0 0 |
| 58 | 0 0 0 0 0 0 1 |
| 59 | 0 0 0 0 0 1 0 |
| 60 | 0 0 0 0 1 0 0 |
| 61 | 0 0 0 1 0 0 0 |
| 62 | 0 0 1 0 0 0 0 |
| 63 | 0 1 0 0 0 0 0 |

"Channel Quality" Write of the PN Sequence for Dibit Extraction

It is preferable that the chip be able to write the PN pattern on its own (without the need to store the correct write pattern elsewhere). The basics are as follows:

1. The PN sequence is generated in an LFSR such as in FIG. 4. Alignment is only an issue if it is desired to center the dibit—alignment can be fully compensated on the extraction. However, the same pattern should be written every time so that the alignments do not vary from one extraction to the next. In other words, the same initial seed should be used for the PN sequence write sequence and the write should not move around randomly.

2. The PN sequence write must be a direct write. The write path must be set up to avoid any Encoder, Precoder, or other 'scrambler'.

3. As usual, write control comes from Write Gate, with normal preamble and sync mark.

OTHER ISSUES, EMBODIMENTS, AND VARIATIONS

1. A seed table map can be stored in hardware, firmware, software, registers, memory, and/or any other medium capable of storing such information.

2. A variable/programmable offset can be employed to allow the unequalized dibit to be centered.

3. Multi-sector accumulations can be performed if employing a sufficiently large accumulator.

4. The LFSR can be programmable. The ability to change the length and the polynomial that define the PN sequence can make a dibit extraction module more flexible.

Figure 15:
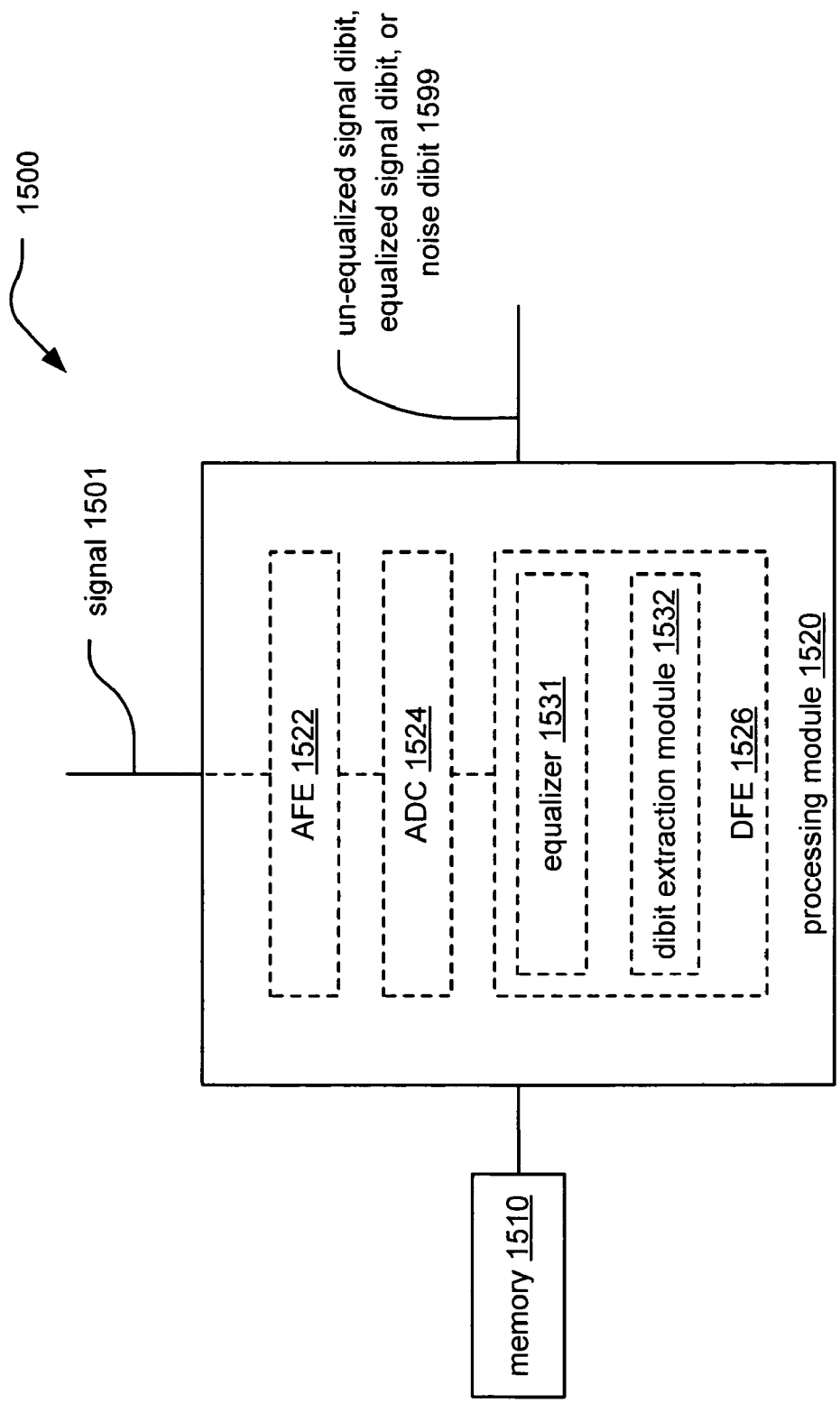
FIG. 15 illustrates another embodiment of an apparatus that is operable to perform dibit extraction.

FIG. 15 illustrates another embodiment of an apparatus 1500 that is operable to perform dibit extraction. The apparatus 1500 includes a processing module 1520, and a memory 1510. The memory 1510 is coupled to the processing module 1520, and the memory 1510 is operable to store operational instructions that enable the processing module 1520 to perform a variety of functions. The processing module 1520 is operable to receive a signal 1501 that is read via a read channel of a storage media to which a PN (Pseudo-Noise) sequence has been written. Thereafter, the processing module 1520 is operable to process the signal thereby generating a processed sequence.

In various instances, this processing of the signal 1520 can be implemented in different ways. For example, an AFE (Analog Front End) 1522 can be implemented to perform a variety of analog type processing including anti-aliasing low pass filtering, variable gain adjustment (VGA), DC offset correction, magneto-resistive asymmetry (MRA) correction as well as other analog type processing functions. Thereafter, an ADC (Analog to Digital Converter) 1524 can be implemented to sample the processed signal thereby generating a digital signal that is a sequence of discrete values. This processing of the ADC 1524 can also be viewed as processing of the signal 1501. The sequence generated within the ADC 1524 is then provided to a DFE (Digital Front End) 1526. The DFE 1526 can also be implemented to include an equalizer 1531 and a dibit extraction module 1532. Clearly, the equalizer 1531 is operable to generate an equalized sequence from the sequence output from the ADC 1524. This also can be viewed as processing of the signal 1501 that is received initially by the processing module 1520.

After the signal 1501 has been processed using whichever type of processing employed in the given instance (thereby generating a processed sequence), the processing module 1520 is operable to estimate a dibit of the channel by processing the processed sequence and a PN sequence that includes values of +k and 0. In some instances, k is equal to a value of 1, but it may alternatively be scaled to any desired value. This can be performed using the dibit extraction module 1532 of the DFE 1526 within the processing module 1520 in certain embodiments.

In some possible implementations, the processing module 1520 can either estimate the dibit of the channel by correlating the processed sequence and the PN sequence that includes values of +k and 0, or estimate the dibit of the channel by convolving the processed sequence and a time reversed version of the PN sequence that includes values of +k and 0. The dibit generated within the processing module 1520 may be an unequalized signal dibit, an equalized signal dibit, or a noise dibit.

The processing module 1520 can be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 1510 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 1520 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 16:
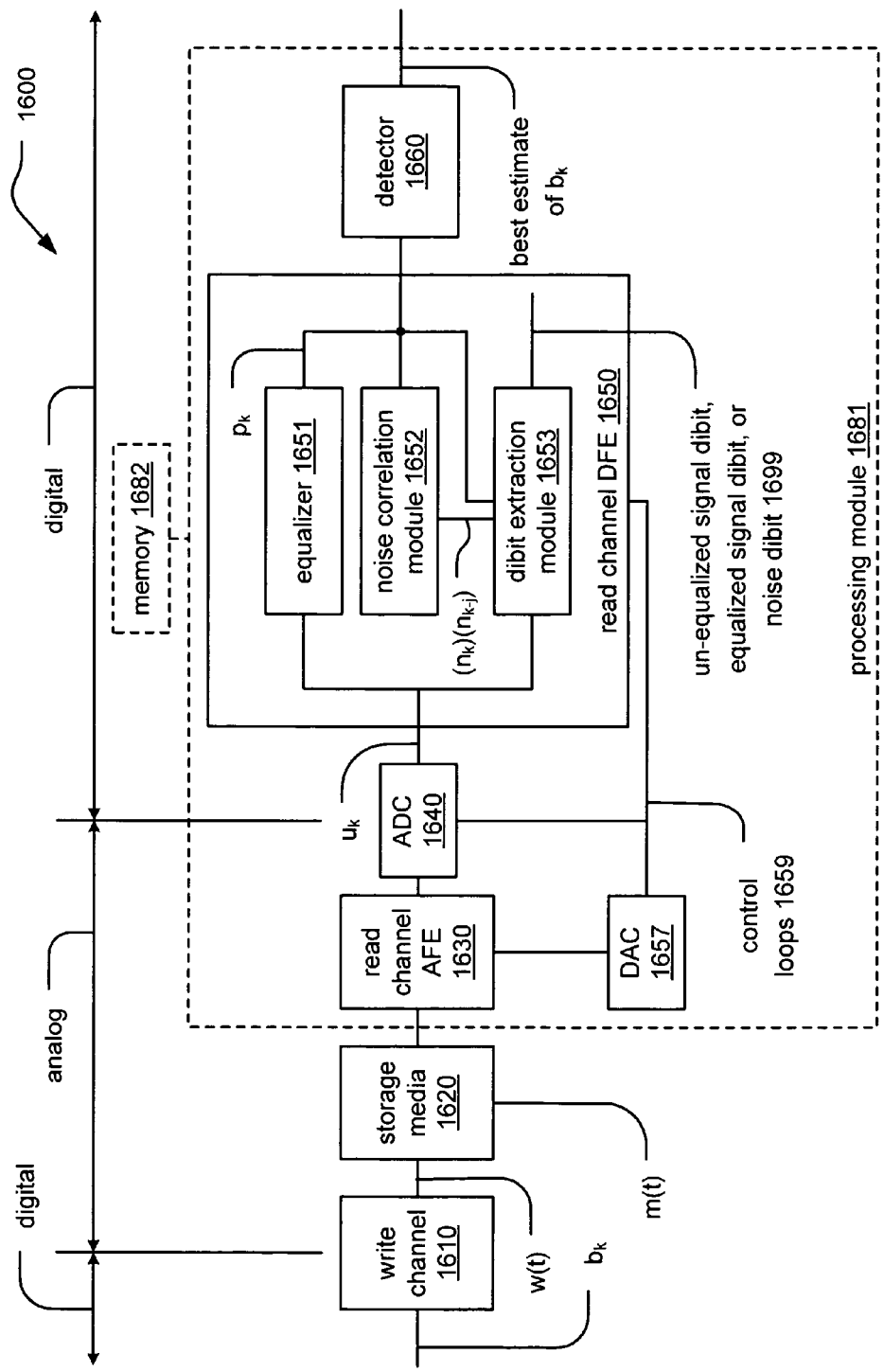
FIG. 16 illustrates another embodiment of an apparatus that is operable to perform dibit extraction.

FIG. 16 illustrates another embodiment of an apparatus 1600 that is operable to perform dibit extraction. The apparatus 1600 includes at least a processing module 1681 and a memory 1682 that is operable to store operational instructions to enable the processing module 1681 to perform dibit extraction. As described above with respect to the processing module 1520 and the memory 1510 of the embodiment of FIG. 15, the processing module 1681 and the memory 1682 of the embodiment of FIG. 16 can also be implemented using any 1 or more of the wide variety of components described above.

A binary PN sequence, $b_k$, consisting of values (0, k), where k is often a value of 1, is provided to a write channel 1610 that is operable to generate an analog write current, w(t), that is a continuous time signal varies between the values of +w and −w according to the transition properties of the PN sequence, $b_k$, which is a sequence of discrete values transitioning between 0 and k (or 1) according to the PN pattern employed.

The analog write current, w(t), perform saturation magnetization to a storage media 1620 that can be characterized as a magnetization signal, m(t), that is a continuous time signal varies between the values of +m and −m according to the transition properties of the PN sequence, $b_k$, as well as the analog write current, w(t).

Thereafter, the processing module 1681 is operable to perform dibit extraction of a read channel of the storage media 1620 to which the PN sequence has been written. The processing module 1681 is operable to receive a signal that is read via the read channel of a storage media 1620. Thereafter, the processing module 1681 is operable to process the signal thereby generating a processed sequence.

Analogous to some of the other embodiments described above, this processing of the signal can be implemented in different ways. For example, a read channel AFE 1630 can be implemented to perform a variety of analog type processing including anti-aliasing low pass filtering, variable gain adjustment (VGA), DC offset correction, magneto-resistive asymmetry (MRA) correction as well as other analog type processing functions. Thereafter, an ADC 1640 can be implemented to sample the processed signal thereby generating a digital signal that is a sequence of discrete values. This sequence can be viewed as being an unequalized sequence, $u_k$. This processing of the ADC 1640, in generating the unequalized sequence, $u_k$, can be viewed as processing of the signal that is received from the storage media 1620 via the read channel.

The unequalized sequence, $u_k$, generated within the ADC 1640 is then provided to a read channel DFE 1650. The read channel DFE 1650 can also be implemented to include an equalizer 1651 and a dibit extraction module 1653. If desired, the DFE 1650 can also be implemented to include other functionalities such as baseline wander correction (as in a perpendicular magnetic recording (PMR) case) as well as govern the timing, gain, DC, and MRA control loops as shown by the feedback control loops 1659. The digital control signals provided back to the read channel AFE 1630 would need to pass through a DAC (Digital to Analog Converter) 1657. It is noted that other digital functionality can also be implemented within the read channel DFE 1650 as well without departing from the scope and spirit of the invention.

The equalizer 1651 is operable to process the unequalized sequence, $u_k$, thereby generating an equalized sequence, $p_k$. By processing the equalized sequence, $p_k$, using a predetermined partial response target as governed within the equalizer 1651, an equalized sequence can be generated. In other words, the equalized sequence, $p_k$, is an equalized partial response (PR) PN sequence. Mathematically, the equalized sequence, $p_k$, can be represented as follows.

$p_k = a_k * t_k$, where $a_k = (2 \times b_k) - 1$, which is a sequence which varies between (+x, −x), where x is often a value of 1.

$t_k$ is a partial response (PR) target. For some examples, for a longitudinal magnetic recording (LMR) case, the PR4: [1, 0, −1] target can be employed. For a perpendicular magnetic recording (PMR) case, the PR1: [1, 1] target can be employed.

The dibit extraction module 1653 is operable to perform dibit extraction thereby generating an unequalized signal dibit, an equalized signal dibit, or a noise dibit, depending on the implementation or the functionality selected in a given instance. In addition, a noise correlation module 1652 can be implemented to receive the equalized sequence, $p_k$, and to generate a noise correlation sequence (shown as $(n_k)(n_{k-j})$) there from.

As mentioned above, the unequalized sequence is depicted as $u_k$. The noise sequence is depicted as $n_k$, and it is determined as follows.

$n_k = p_k - d_k$, where $d_k$ is the sequence of a predetermined partial response target. This can be viewed as being a sequence that includes the ideal or desired samples (or the detected samples).

Once this noise sequence, $n_k$, is determined, then a noise correlation sequence, $(n_k)(n_{k-j})$, can be generated using it and at least one appropriate lag. For example, the noise correlation sequence, $(n_k)(n_{k-j})$, can be depicted as follows:

$(n_k)(n_{k-j})$, $j=0:j_{max}$, (where a typical value for $j_{max}$ can be 4). Expressed another way, this noise correlation sequence is the noise correlation as determined by the $j^{th}$ lag.

The dibit extraction module 1653 receives 3 inputs:

1. unequalized sequence, $u_k$
2. equalized sequence, $p_k$
3. noise correlation sequence, $(n_k)(n_{k-j})$ Depending on which of these 3 inputs the dibit extraction module 1653 operates in a given instance, any of an unequalized signal dibit, an equalized signal dibit, or a noise dibit can be generated.

It is also noted that the equalized sequence, $p_k$, is provided to a detector 1660 that is operable to make a best estimate of the binary PN sequence, $b_k$, consisting of values (0, k) that has been provided to the write channel 1610 in the first place.

Each of these processing functions within the analog AFE 1630, the ADC 1640, and the read channel DFE 1650 (equalization and noise correlation processing) can also be viewed as processing of the signal that is received from the storage media 1620 via the read channel by the processing module 1681.

After the signal has been processed using whichever type of processing employed in the given instance (thereby generating a processed sequence), the processing module 1681 is operable to estimate a dibit of the channel by processing the processed sequence and a PN sequence that includes values of +k and 0. In some instances, k is equal to a value of 1, but it may alternatively be scaled to any desired value. This can be performed using the dibit extraction module 1653 of the read channel DFE 1650 within the processing module 1681 in certain embodiments.

As analogously described within other embodiments, the processing module 1681 can either estimate the dibit of the channel by correlating the processed sequence and the PN sequence that includes values of +k and 0, or estimate the dibit of the channel by convolving the processed sequence and a time reversed version of the PN sequence that includes values of +k and 0. The dibit generated within the processing module 1681 may be an unequalized signal dibit, an equalized signal dibit, or a noise dibit.

The processing module 1681 is therefore operable to receive a signal that is read via a read channel of the storage media to 1620 which the PN sequence, $b_k$, consisting of values (0, k), has been written. Using one or more of the various components, functional blocks, and/or modules in the processing module 1681, the processing module 1681 is operable to perform a variety of operations. It is operable to perform analog processing and digital sampling of the signal thereby generating a received sequence (which can be viewed as being the unequalized sequence, $u_k$). In addition, it is operable to equalize the received sequence thereby generating an equalized sequence, $p_k$. It is operable to calculate a noise sequence using the equalized sequence, $p_k$, and an expected sequence (e.g., $d_k$). It can then generate the noise correlation sequence, $(n_k)(n_{k-j})$, using a noise sequence, $n_k$, and a lag, $j_{max}$.

Thereafter, the processing module 781, using the dibit extraction module 1653 therein in one embodiment, is operable to estimate a dibit of the channel by correlating the received sequence (e.g., the unequalized sequence, $u_k$), the equalized sequence (equalized sequence, $p_k$), or the noise correlation sequence ($(n_k)(n_{k-j})$) and the PN sequence, $b_k$, that includes values of +k and 0 (where k can be equal to 1). Alternatively, the processing module 781, using the dibit extraction module 1653, is operable to estimate the dibit of the channel by convolving the received sequence (e.g., the unequalized sequence, $u_k$), the equalized sequence (equalized sequence, $p_k$), or the noise correlation sequence ($(n_k)(n_{k-j})$) and the PN sequence, $b_k$, that includes values of +k and 0 (where k can be equal to 1) and a time reversed version of the PN sequence that includes values of +k and 0.

In view of the above detailed description of the invention and associated drawings, other modifications and variations will now become apparent. It should also be apparent that such other modifications and variations may be effected without departing from the spirit and scope of the invention.

APPENDIX A

Cross-Correlation Differences Between Write Current and Binary PN Sequences

U.S. Pat. No. 6,208,477 performs dibit extraction based on the correlation properties of the PN write current sequence, $u(k) \epsilon (+1,-1)$. It uses the fact that correlating $u(k)$ with itself produces an impulse with a small DC offset, i.e., $$\sum_{m=0}^{N-1} u(k) \cdot u(k-m) = \begin{cases} N, & k=0 \\ -1 & k \neq 0 \end{cases} \quad (EQ\ A1)$$

The summation above can also be interpreted as a convolution of $u(k)$ with a time reversed version of itself, $u(-k)$. With this interpretation, it can be seen that the time reversed write current is approximately the deconvolution sequence (to within a scale factor and a DC offset).

On the other hand, if $u(k)$ can be cross-correlated with a binary version of the PN sequence, $u_{bin}(k) \epsilon (0,1)$, the following is achieved:

$$\sum_{m=0}^{N-1} u(k) \cdot u_{bin}(k-m) = \begin{cases} (N+1)/2, & k=0 \\ 0 & k \neq 0 \end{cases} \quad (EQ\ A2)$$

This is just a scale factor away from a unit pulse, and it can be seen that the binary version of the PN sequence is a much better approximation to the actual deconvolution sequence of $u(k)$. In this case, it gets the DC correct and is only off by a scale factor. In most cases, the scale factor is unimportant, so the time reversed binary PN sequence, $u_{bin}(-k) \epsilon (0,1)$ is for most practical purposes, the deconvolution sequence for PN sequence write current, $u(k)$.

Note: (EQ A1) corresponds to the old method, and (EQ A2) corresponds to the new method. For longitudinal channels with DC free dibits, the DC offset of (EQ A1) is not a problem because it is zeroed out by convolution with the DC-free dibit. However, for non-DC-free (perpendicular and noise) dibits, (EQ A2) is better. The DC offset introduced by (EQ A1) can be corrected with post-processing, but the computation is expensive and inconvenient.

From (EQ A2), it is seen that the unscaled (practical) deconvolution sequence (cf (12)) is given by $$v(k) = u_{bin}(-k). \quad (EQ\ A3)$$

And, the unscaled (practical) pseudo-deconvolution sequence used in prior art is given by $$v_{priorArt}(k) = u(-k) = 2u_{bin}(-k) - 1 \quad (EQ\ A4)$$

The big disadvantage of (EQ A4) is that the resultant dibit response is not only off by a scale factor, but it is also off by a DC offset. The incorrect dibit response, $\tilde{g}(k) = y(k) \otimes u(-k)$, that results from (EQ A4), must be corrected as follows, $$g(k) = \frac{1}{N+1}(\tilde{g}(k) - \text{mean}(\tilde{g}(k))) + \text{mean}(\tilde{g}(k)) \quad (EQ\ A5)$$

Since $N+1=2^b$ is a power of two, the scaling can be implemented with a trivial bit shift, but the $$\text{mean}(\tilde{g}(k)) = \frac{1}{N}\sum_{k=0}^{N-1} \tilde{g}(k) \quad (EQ\ A6)$$

is not trivial. It means that all N values of $\tilde{g}(k)$ must be computed with the dibit extraction circuit whether they are needed or not, then N−1 adds must be done to sum the N values and finally, the sum must be divided by N (which is not a power of two).

On the other hand, the dibit response, $\tilde{h}(k) = y(k) \otimes u_{bin}(-k)$, that comes from using (A3) is only off by a (power of two) scale factor and is easily corrected, $$h(k) = \frac{2}{N+1}\tilde{h}(k). \quad (EQ\ A7)$$

In many cases, the scaling in (EQ A7) can be ignored. Thus, even though the difference between (EQ A1) and (EQ A2) is small, the difference between (EQ A5) and (EQ A7) is not so small. Of course, when the dibit mean is zero (as is normally true for longitudinal dibits), then there is no significant difference between (EQ A5) and (EQ A7). However, for perpendicular and noise dibits, the mean is normally non-zero and unknown. Future hard drives are expected to be perpendicular and noise dibits are becoming increasingly popular, so making the dibit extraction circuit easier to use and more efficient is important.

What is claimed is:

1. An apparatus, comprising:
   a processing module; and
   a memory, coupled to the processing module, that is operable to store operational instructions that enable the processing module to:
   receive a signal that is read via a read channel of a storage media to which a PN (Pseudo-Noise) sequence has been written;
   process the signal thereby generating a processed sequence; and
   estimate a dibit of the channel by convolving the processed sequence and a time reversed version of the PN sequence that includes values of +k and 0.

2. The apparatus of claim 1, wherein:
   k has a value of 1.

3. The apparatus of claim 1, wherein the memory, coupled to the processing module, is operable to store operational instructions that enable the processing module to:
   estimate the dibit of the channel by correlating the processed sequence and the PN sequence that includes values of +k and 0.

4. The apparatus of claim 1, wherein:
   the apparatus is a hard disk drive.

5. The apparatus of claim 1, wherein:
   the dibit is an unequalized signal dibit, an equalized signal dibit, or a noise dibit.

6. The apparatus of claim 1, wherein the memory, coupled to the processing module, is operable to store operational instructions that enable the processing module to:
   process the signal using equalization thereby generating an equalized sequence;
   the equalized sequence is the processed sequence; and
   the dibit is an equalized signal dibit.

7. The apparatus of claim 1, wherein the memory, coupled to the processing module, is operable to store operational instructions that enable the processing module to:
process the signal using equalization governed by a predetermined partial response target thereby generating an equalized sequence;
the equalized sequence is the processed sequence; and
the dibit is an equalized signal dibit.

8. The apparatus of claim 1, wherein the memory, coupled to the processing module, is operable to store operational instructions that enable the processing module to:
process the signal using equalization thereby generating an equalized sequence;
the equalized sequence is the processed sequence;
calculate a noise sequence using the equalized sequence and an expected sequence;
generate a noise correlation sequence using the noise sequence and a lag;
the noise correlation sequence is the processed sequence; and
the dibit is a noise dibit.

9. The apparatus of claim 1, wherein:
the dibit of the channel has approximately zero DC offset.

10. The apparatus of claim 1, wherein:
the processing module includes an AFE (Analog Front End) that is operable to perform at least one of filtering, gain adjustment, DC offset correction, magneto-resistive asymmetry correction, and an ADC (Analog to Digital Converter) that is operable digitally to sample the signal to process the signal that is read via the read channel of the storage media thereby generating the processed sequence.

11. An apparatus, comprising:
a processing module; and
a memory, coupled to the processing module, that is operable to store operational instructions that enable the processing module to:
receive a signal that is read via a read channel of a storage media to which a PN (Pseudo-Noise) sequence has been written;
perform analog processing and digital sampling of the signal thereby generating a received sequence;
equalize the received sequence thereby generating an equalized sequence;
calculate a noise sequence using the equalized sequence and an expected sequence;
generate a noise correlation sequence using the noise sequence and a lag; and
estimate a dibit of the channel by convolving the received sequence, the equalized sequence, or the noise correlation sequence and a time reversed version of the PN sequence that includes values of +k and 0.

12. The apparatus of claim 11, wherein:
k has a value of 1.

13. The apparatus of claim 11, wherein:
the dibit is an unequalized signal dibit, an equalized signal dibit, or a noise dibit.

14. The apparatus of claim 11, wherein:
the dibit of the channel has approximately zero DC offset.

15. A method, comprising:
receiving a signal that is read via a read channel of a storage media to which a PN (Pseudo-Noise) sequence has been written;
processing the signal thereby generating a processed sequence; and
estimating a dibit of the channel by convolving the processed sequence and a time reversed version of the PN sequence that includes values of +k and 0.

16. The method of claim 15, wherein:
k has a value of 1.

17. The method of claim 15, wherein:
the method is performed within a hard disk drive.

18. The method of claim 15, wherein:
the dibit is an unequalized signal dibit, an equalized signal dibit, or a noise dibit; and
the unequalized signal dibit, the equalized signal dibit, or the noise dibit has approximately zero DC offset.

19. The method of claim 15, further comprising:
processing the signal using equalization governed by a predetermined partial response target thereby generating an equalized sequence; and wherein:
the equalized sequence is the processed sequence; and
the dibit is an equalized signal dibit.

20. The method of claim 15, further comprising:
processing the signal using equalization thereby generating an equalized sequence, wherein the equalized sequence is the processed sequence;
calculating a noise sequence using the equalized sequence and an expected sequence;
generating a noise correlation sequence using the noise sequence and a lag; and wherein
the noise correlation sequence is the processed sequence; and
the dibit is a noise dibit.

* * * * *